United States Patent
Ko et al.

(10) Patent No.: US 12,458,478 B2
(45) Date of Patent: Nov. 4, 2025

(54) ORAL CAVITY CLEANER FOR SUPPLYING WASHING WATER AND DISCHARGING CONTAMINATED WATER

(71) Applicant: SMDsolution Co., Ltd., Seoul (KR)

(72) Inventors: Sungkwon Ko, Chuncheon-si (KR); Hyunjong Kim, Seongnam-si (KR)

(73) Assignee: SMDsolution Co., Ltd., Seoul (KR)

( * ) Notice: Subject to any disclaimer, the term of this patent is extended or adjusted under 35 U.S.C. 154(b) by 1043 days.

(21) Appl. No.: 17/512,728

(22) Filed: Oct. 28, 2021

(65) Prior Publication Data

US 2022/0133450 A1 May 5, 2022

(30) Foreign Application Priority Data

Oct. 30, 2020 (KR) .......................... 10-2020-0143685
Nov. 30, 2020 (KR) .......................... 10-2020-0164332

(51) Int. Cl.
*A61C 17/02* (2006.01)
*A61C 17/06* (2006.01)

(52) U.S. Cl.
CPC .......... *A61C 17/0211* (2013.01); *A61C 17/06* (2019.05)

(58) Field of Classification Search
CPC .......... A61C 17/00; A61C 17/02–0217; A61C 17/024–032; A61C 17/06–135
See application file for complete search history.

(56) References Cited

U.S. PATENT DOCUMENTS

| 2,957,476 | A  | * | 10/1960 | Freeman ............ A61C 17/0208 |
|           |    |   |         | 433/88 |
| 3,758,950 | A  | * | 9/1973  | Krouzian ............... A61C 17/08 |
|           |    |   |         | 433/91 |
| 4,164,940 | A  |   | 8/1979  | Quinby |
| 6,893,259 | B1 | * | 5/2005  | Reizenson ......... A61C 17/0211 |
|           |    |   |         | 433/29 |
| 12,150,825| B2 | * | 11/2024 | Ko ......................... A61C 17/02 |
| 2011/0059416 | A1 | | 3/2011 | Lee |
| 2018/0000573 | A1 | | 1/2018 | Miller et al. |
| 2018/0116773 | A1 | * | 5/2018 | Chen .................... A61C 17/028 |

(Continued)

FOREIGN PATENT DOCUMENTS

| EP | 1700578 A1 | 9/2006 |
| JP | 2015-512761 A | 4/2015 |

(Continued)

OTHER PUBLICATIONS

Office Action of Japanese Patent Application No. 2023-523183 mailed Mar. 26, 2024.

(Continued)

*Primary Examiner* — Rachel T Sippel
*Assistant Examiner* — Jacqueline M Pinderski
(74) *Attorney, Agent, or Firm* — Revolution IP, PLLC

(57) ABSTRACT

An oral cavity cleaner includes a mouthpiece that sprays washing water into the oral cavity, a core suction part that suctions contaminated water formed by mixing the washing water and saliva inside the oral cavity, and a handle having an inflow path for introducing the washing water, a discharge flow path for removing the contaminated water, and a diffusion flow path that defines a space through which the washing water is directed toward at least one of the upper or lower sides of the discharge flow path and is delivered to the mouthpiece.

16 Claims, 31 Drawing Sheets

(56) References Cited

U.S. PATENT DOCUMENTS

| | | | |
|---|---|---|---|
| 2018/0125622 A1* | 5/2018 | Almoumen | A61C 1/0023 |
| 2018/0140402 A1 | 5/2018 | Chu | |
| 2019/0021829 A1* | 1/2019 | Lee | A46B 9/04 |
| 2019/0223991 A1 | 7/2019 | Kramer | |
| 2020/0253703 A1* | 8/2020 | Ouin | A61C 17/26 |

FOREIGN PATENT DOCUMENTS

| | | | | |
|---|---|---|---|---|
| JP | 2015-229085 A | 12/2015 | | |
| JP | 2017-506138 A | 3/2017 | | |
| JP | 2018-504967 A | 2/2018 | | |
| KR | 10-1993-0021160 A | 11/1993 | | |
| KR | 20-2008-0001544 U | 6/2008 | | |
| KR | 10-1449724 B1 | 10/2014 | | |
| KR | 10-2018-0037964 A | 4/2018 | | |
| KR | 10-1894231 B1 | 9/2018 | | |
| KR | 10-2056383 B1 | 12/2019 | | |
| WO | 2017-115836 A1 | 7/2017 | | |
| WO | WO-2020045708 A1 * | 3/2020 | | A61C 17/0208 |

OTHER PUBLICATIONS

Non-Final Office Action of U.S. Appl. No. 17/512,731 mailed Feb. 11, 2025.

Non-Final Office Action of U.S. Appl. No. 17/512,736 mailed Apr. 4, 2025.

* cited by examiner

<u>100</u>

S1 ⎯⎯⎯→
S3 ⋯⋯⋯→

S1 ⟶
S3 ⟶

ORAL CAVITY CLEANER FOR SUPPLYING WASHING WATER AND DISCHARGING CONTAMINATED WATER

CROSS-REFERENCE TO RELATED APPLICATIONS

This application claims priority to and the benefit of Korean Patent Application No. 10-2020-0143685 filed in the Korean Intellectual Property Office on Oct. 30, 2020; Korean Patent Application No. 10-2020-0164332 filed in the Korean Intellectual Property Office on Nov. 30, 2020, the entire contents of which are incorporated herein by reference.

TECHNICAL FIELD

The present disclosure relates to an oral cavity cleaner, and more particularly, to a structure of an oral cavity cleaner that sprays washing water into an oral cavity and sucks and discharges contaminated water in the oral cavity.

BACKGROUND ART

FIG. 1 is a view illustrating numbers indicated to distinguish teeth depending on positions. FIG. 2 is a view illustrating names of portions of a tooth.

Referring to FIGS. 1 to 2, the number of human teeth is generally 26 to 32. Because a typical bone has a blood vessel therein, the bone may be regenerated by being supplied with nutrients to the bone through blood even though the bone is broken. However, because a blood vessel does not reach enamel of the tooth, the tooth cannot be regenerated. Therefore, it is very important to manage the tooth.

When acid comes into contact with the enamel of the tooth, calcium is slightly reduced. However, when acidity in an oral cavity changes to basic, calcium ions in saliva are crystallized on the enamel, such that the enamel of the tooth is slightly restored. The surface of the enamel is kept by repeatedly losing and recovering calcium per moment daily as long as the tooth tissue is not lost.

However, bacteria create plaque while proliferating by eating food and drink remaining after a meal. *Streptococcus mutans* is one of the bacteria that create plaque. The *Streptococcus mutans* increases the acidity of the tooth, which corrodes the tooth and causes an adverse effect such as inflammation of gums. In addition, the plaque inhibits the calcium ions, which are mixed with saliva and restore the damaged tooth, from moving to the tooth. The calcium ions, which cannot move to the tooth, are absorbed in the plaque and crystallized. The plaque, in which the calcium ions are absorbed and crystallized, is hardened and fused with the tooth. This causes tartar. The tartar blocks an outer portion of the enamel, but transmits the acid and captures the calcium ions, which interrupts chemical restoration of the surface of the enamel. The tartar, which is created in this manner, makes it difficult to remove the plaque, and this vicious cycle is repeated. In other words, once the tooth is weakened, the tooth cannot be strengthened even though the tooth is cleaned. In addition, the tartar provides proliferation sites of harmful bacteria, particularly, *gingivalis*, and causes inflammation and necrosis of the gum.

A basic preventive measure is to remove plaque and waste matters between the teeth by appropriately brushing the teeth. However, because the arrangement of teeth varies from person to person, there may inevitably be a portion difficult to manage even though the teeth are brushed properly. In particular, when the teeth are irregularly arranged, difficulty in brushing the teeth is increased.

Therefore, there is a need for an oral cavity cleaner capable of maintaining cleanliness of an oral cavity regardless of arrangement of teeth.

SUMMARY OF THE INVENTION

An object of the present disclosure is to provide an oral cavity cleaner capable of allowing washing water supplied from the outside and contaminated water sucked from the inside of an oral cavity to simultaneously flow and allowing the washing water and the contaminated water to smoothly flow.

An exemplary embodiment of the present disclosure provides an oral cavity cleaner including: a mouthpiece configured to spray washing water into an oral cavity; a core suction part configured to suck contaminated water, in which the washing water and saliva are mixed, from the inside of the oral cavity; and a handle including an inflow path through which the washing water flows, a discharge flow path through which the contaminated water flows, and a diffusion flow path configured to define a space in which the washing water flows in a direction toward at least one of upper and lower sides of the discharge flow path, the diffusion flow path being configured to supply the washing water to the mouthpiece.

According to the exemplary embodiment of the present disclosure, the handle may include a diffusion boundary portion disposed at an upstream side (rear end) of the discharge flow path and configured to linearly increase a transverse width of the diffusion flow path.

According to the exemplary embodiment of the present disclosure, the oral cavity cleaner may include: a suction pipe configured to connect the core suction part and the discharge flow path, the core suction part may include a diffusion restriction portion configured to block an inflow of the washing water flowing along the diffusion flow path, and a diffusion restriction groove formed in the diffusion restriction portion and fastened to one end of the suction pipe, and the diffusion boundary portion may have a diffusion boundary groove fastened to the other end of the suction pipe and protrude in the handle to prevent the washing water flowing along the diffusion flow path from being introduced into the discharge flow path.

According to the exemplary embodiment of the present disclosure, the handle may include a connection partition wall disposed in an oblique direction so that a cross-sectional area of a flow path of the discharge flow path decreases from a rear end thereof to a front end thereof.

According to the exemplary embodiment of the present disclosure, a flow path guide may be disposed in the handle and provided at a point at which the handle and the mouthpiece are connected, and the flow path guide may allow the washing water discharged from the inflow path to flow in different directions.

According to the exemplary embodiment of the present disclosure, the flow path guide may be disposed at a position facing front teeth and divide a flow direction of the washing water in a leftward/rightward direction of the front teeth.

According to the exemplary embodiment of the present disclosure, the mouthpiece may include: a left labial surface corresponding portion and a right labial surface corresponding portion formed at positions facing labial surfaces of the teeth; a left buccal surface corresponding portion and a right buccal surface corresponding portion formed at positions facing buccal surfaces of the teeth; and a left lingual surface corresponding portion and a right lingual surface corresponding portion formed at positions facing lingual surfaces of the teeth, and the flow path guide may be disposed to divide the washing water and allow the washing water to flow toward the left labial surface corresponding portion and the right labial surface corresponding portion.

According to the exemplary embodiment of the present disclosure, the flow path guide may be inclinedly disposed on a centerline in a forward/rearward direction of the mouthpiece and the handle.

According to the exemplary embodiment of the present disclosure, the oral cavity cleaner may include a suction pipe configured to connect the core suction part and the discharge flow path and define a concentration flow path through which the contaminated water flows, and the suction pipe may be detachably disposed in the diffusion flow path.

According to the exemplary embodiment of the present disclosure, the diffusion flow path and the concentration flow path may intersect each other.

According to the exemplary embodiment of the present disclosure, the handle may include a mouth guard formed on an outer peripheral surface of the handle and having transverse ends curved rearward.

According to the exemplary embodiment of the present disclosure, the handle may include an elliptical mouth guard formed in an elliptical shape and having transverse ends curved rearward.

Another exemplary embodiment of the present disclosure provides an oral cavity cleaner including: a mouthpiece configured to spray washing water into an oral cavity; a core suction part configured to suck contaminated water, in which the washing water and saliva are mixed, from the inside of the oral cavity; and a handle including an inflow path in which the washing water flows, a diffusion flow path configured to connect the inflow path and the mouthpiece, and a discharge flow path through which the contaminated water discharged from the core suction part flows, in which the handle includes: an inflow partition wall configured to define the inflow path; a discharge partition wall spaced apart from the inflow partition wall and configured to define the discharge flow path; and a connection partition wall configured to connect the discharge partition wall and the inflow partition wall and disposed to be inclined with respect to a centerline in a forward/rearward direction of the handle so that a width of the discharge flow path linearly decreases from a rear side thereof to a front side thereof.

According to the exemplary embodiment of the present disclosure, the oral cavity cleaner may include a suction pipe configured to connect the core suction part and the discharge flow path, the core suction part may include a diffusion restriction portion configured to block an inflow of the washing water flowing along the diffusion flow path, and a diffusion restriction groove formed in the diffusion restriction portion and fastened to one end of the suction pipe, and the diffusion boundary portion may protrude in the handle to prevent the washing water flowing along the diffusion flow path from being introduced into the discharge flow path and have a diffusion boundary groove fastened to the other end of the suction pipe.

According to the exemplary embodiment of the present disclosure, the oral cavity cleaner may include: a suction pipe including: a front channel connected to the discharge flow path; a rear channel connected to the core suction part; and a bending channel configured to connect the rear channel and the front channel and disposed to be inclined with respect to a centerline in the forward/rearward direction of the handle.

According to the exemplary embodiment of the present disclosure, the oral cavity cleaner may include a mouth guard formed on an outer peripheral surface of the handle and having transverse ends curved rearward.

According to the exemplary embodiment of the present disclosure, the mouth guard may be curved in a bow shape, and one transverse side of the mouth guard may come into close contact with adductor pollicis muscle of a thumb, and the other transverse side of the mouth guard may come into close contact with a proximal phalanx of the thumb.

Still another exemplary embodiment of the present disclosure provides an oral cavity cleaner including: a handle including an inflow path through which washing water flows and a discharge flow path through which contaminated water sucked from an oral cavity flows; a mouthpiece connected to the inflow path and configured to spray the washing water into the oral cavity; a core suction part configured to suck the contaminated water that has been discharged from the mouthpiece and washed teeth; and a suction pipe configured to connect the core suction part and the handle, in which a splitter is disposed in the core suction part, at a front side of the suction pipe, and divides the sucked contaminated water.

According to the exemplary embodiment of the present disclosure, the core suction part may have a rear suction hole formed at a position facing a uvula, and the splitter may be disposed between the rear suction hole and the suction pipe.

According to the exemplary embodiment of the present disclosure, the core suction part may have a lower suction hole formed at a position facing a tongue, and the splitter may be disposed at a position at which the splitter divides the lower suction hole.

According to the exemplary embodiment of the present disclosure, the splitter may be made by coupling an upper splitter and a lower splitter which are separately formed, and the lower splitter may be disposed in the lower suction hole.

Yet another exemplary embodiment of the present disclosure provides an oral cavity cleaner including: a handle including an inflow path through which washing water flows and a discharge flow path through which contaminated water sucked from an oral cavity flows; a mouthpiece connected to the inflow path and configured to spray the washing water into the oral cavity; a core suction part configured to suck the contaminated water that has been discharged from the mouthpiece and washed teeth; and a suction pipe configured to connect the core suction part and the handle, in which a damper is formed in the mouthpiece and disposed in a transverse direction of the suction pipe to prevent a collision between the washing water and the suction pipe.

According to the exemplary embodiment of the present disclosure, the mouthpiece may include: a labial surface corresponding portion formed at a position facing labial surfaces of the teeth; a buccal surface corresponding portion connected to the labial surface corresponding portion and formed at a position facing buccal surfaces of the teeth; a lingual surface corresponding portion formed at a position facing lingual surfaces of the teeth; and an intermediation portion configured to connect the labial surface corresponding portion and the lingual surface corresponding portion and having two opposite ends starting from a connection point between the labial surface corresponding portion and the lingual surface corresponding portion, and the damper may be disposed in the intermediation portion.

According to the exemplary embodiment of the present disclosure, the mouthpiece may have a front suction hole formed at a portion facing occlusal surfaces of upper teeth, a vertical protrusion may be formed at an edge of the front suction hole, and the vertical protrusion may protrude inward and define an interval from the suction pipe.

Still yet another exemplary embodiment of the present disclosure provides an oral cavity cleaner including: a handle including an inflow path through which washing water flows and a discharge flow path through which contaminated water sucked from an oral cavity flows; a mouthpiece connected to the inflow path and configured to spray the washing water into the oral cavity; a core suction part configured to suck the contaminated water that has been discharged from the mouthpiece and washed teeth; and a suction pipe configured to connect the core suction part and the handle, in which a water diffuser is disposed in the mouthpiece, and the water diffuser divides the contaminated water discharged from the suction pipe and supplies the contaminated water to the discharge flow path.

According to the exemplary embodiment of the present disclosure, the suction pipe may include: a front channel connected to the discharge flow path of the handle; a rear channel connected to the core suction part; and a bending channel disposed to be inclined with respect to a centerline of the rear channel and a centerline of the front channel and configured to connect the rear channel and the front channel.

According to the exemplary embodiment of the present disclosure, the water diffuser may be disposed on the centerline of the front channel.

According to the exemplary embodiment of the present disclosure, one side of the water diffuser, which is directed toward the front channel, may be disposed in parallel with the centerline of the front channel, and the other side of the water diffuser may be inclined in a direction identical to a direction in which the bending channel is inclined.

According to the exemplary embodiment of the present disclosure, an angle at which the other side is inclined may be equal to an angle at which the bending channel is inclined.

According to the exemplary embodiment of the present disclosure, the mouthpiece may have a front suction hole formed at a portion facing occlusal surfaces of the front teeth among upper teeth, the suction pipe may have a vertical channel disposed at an upper side of the rear channel and configured to communicate with the front suction hole, and the rear channel may have a vertical bar formed at a lower side thereof and configured to define a flow interval, from the mouthpiece, through which the washing water flows.

Other aspects, advantages, and features of the present disclosure will be apparent to those skilled in the art from the following detailed description together with the accompanying drawings.

DETAILED DESCRIPTION

Figure 1:
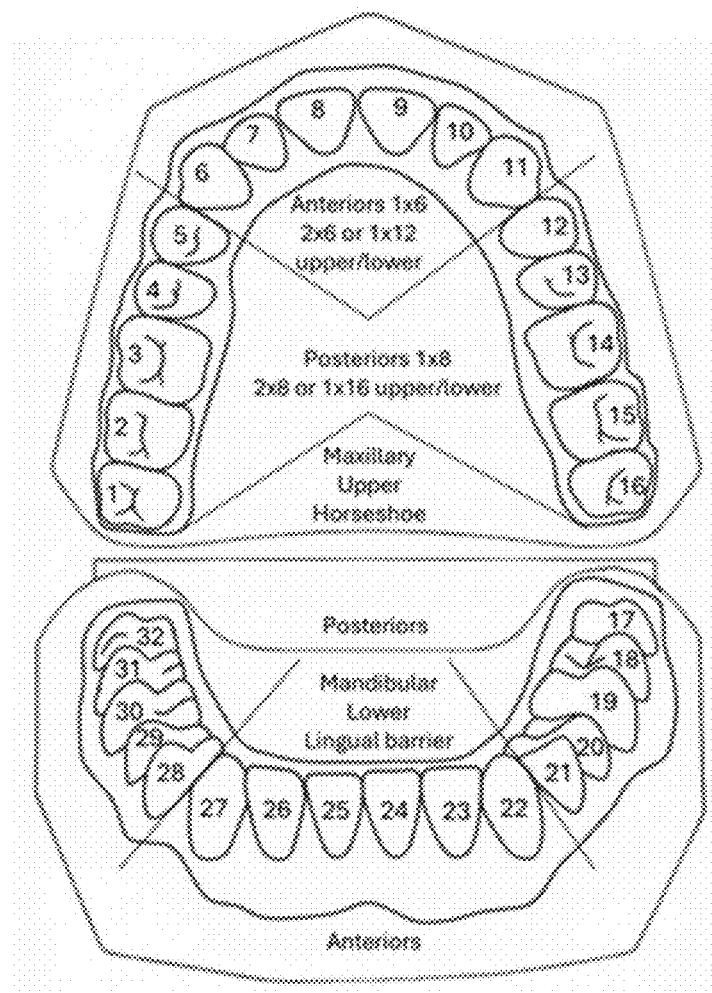
FIG. 1 is a view illustrating numbers indicated to distinguish teeth depending on positions.
Figure 2:
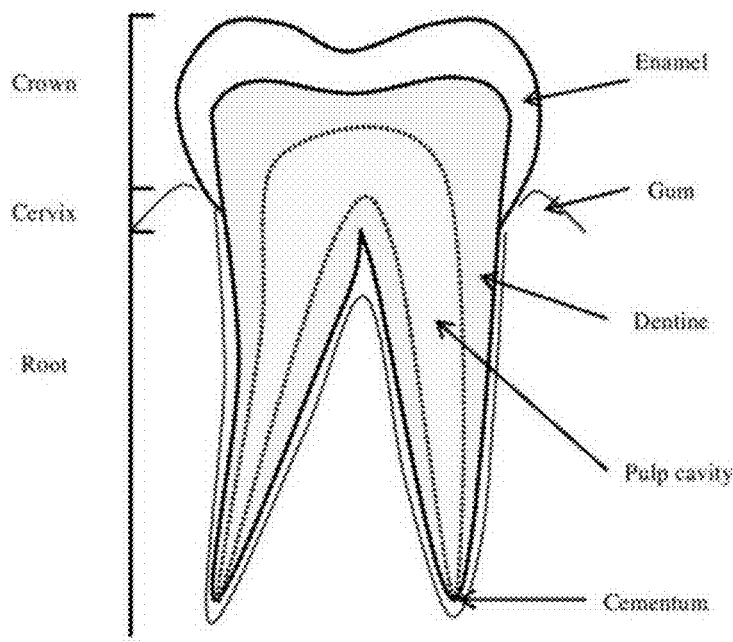
FIG. 2 is a view illustrating names of portions of a tooth.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Throughout the specification, the same reference numerals denote the same constituent elements.

Hereinafter, the present disclosure will be described with reference to the drawings.

Figure 3:
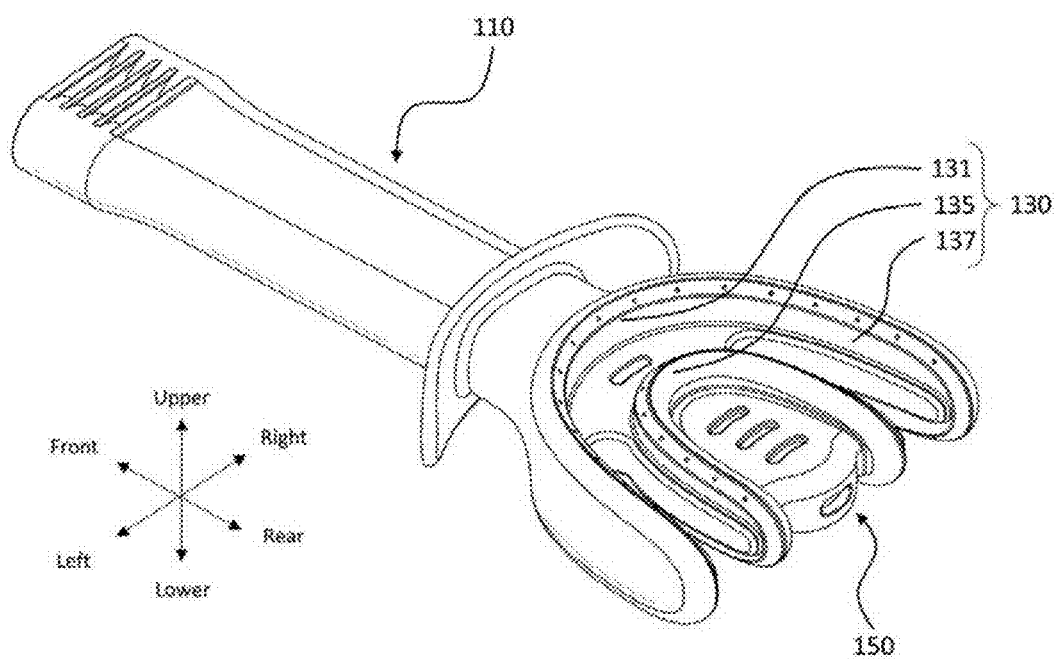
FIG. 3 is a perspective view of an oral cavity cleaner according to an embodiment of the present disclosure.
Figure 4:
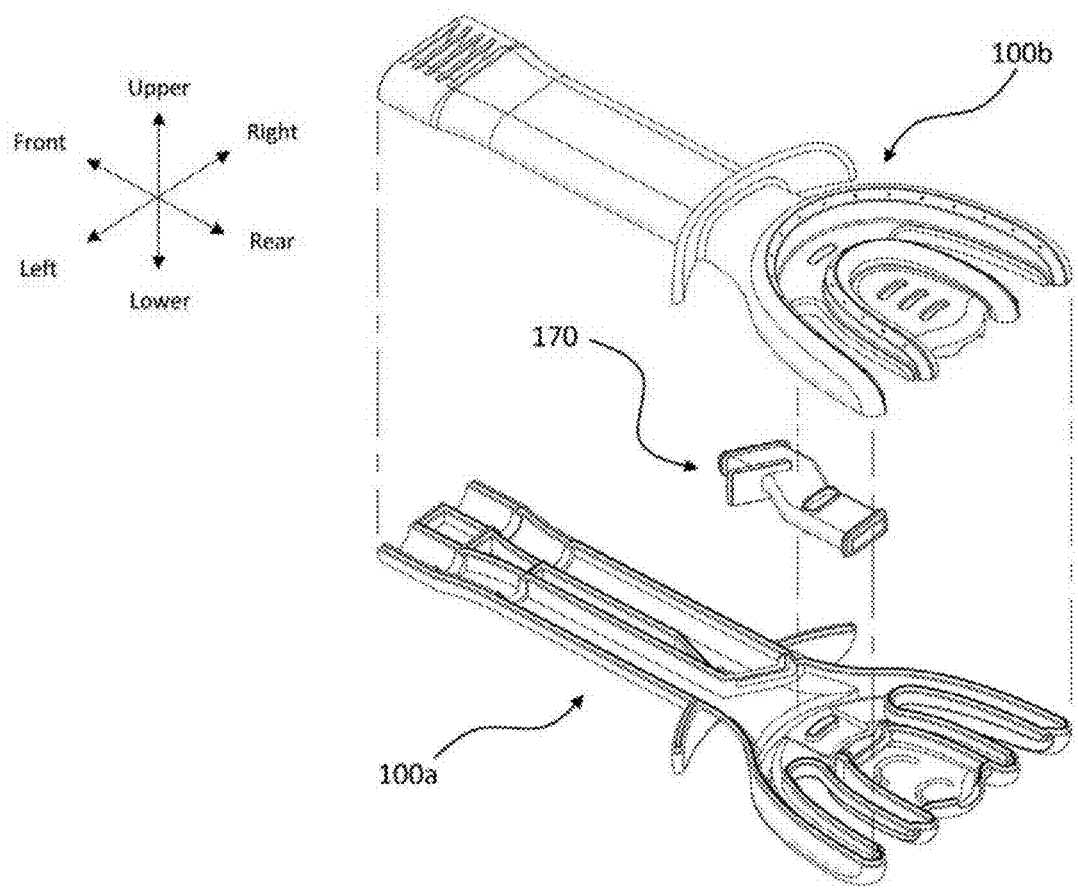
FIG. 4 is an exploded perspective view of the oral cavity cleaner according to the embodiment of the present disclosure.

FIG. 3 is a perspective view of an oral cavity cleaner 100 according to an embodiment of the present disclosure. FIG. 4 is an exploded perspective view of the oral cavity cleaner 100 according to the embodiment of the present disclosure.

Referring to FIGS. 3 to 4, the oral cavity cleaner 100 according to the embodiment of the present disclosure includes a main body (not illustrated) configured to supply washing water 51 and store sucked contaminated water 53, a handle 110 connected to the main body, a mouthpiece 130 connected to the handle 110 and configured to spray the washing water 51, and a core suction part 150 connected to the mouthpiece 130 and configured to suck the contaminated water 53.

The main body may include a plurality of water pumps. The plurality of water pumps generates power for discharging the washing water 51 to the handle 110 and sucking the contaminated water 53 from the core suction part 150. The water pump generates a positive pressure to discharge the washing water 51 and generates a negative pressure to suck the contaminated water 53. The water pump is provided in plural. Any one of the water pumps generates the positive pressure, and another water pump generates the negative pressure.

The handle 110, the mouthpiece 130, and the core suction part 150 may be integrated.

The handle 110, the mouthpiece 130, and the core suction part 150 may be divided into an upper portion 100b and a lower portion 100a. The upper portion 100b may define an upper side of the handle 110, the mouthpiece 130, and the core suction part 150. The lower portion 100a may define a lower side of the handle 110, the mouthpiece 130, and the core suction part 150. The suction pipe 170 may be disposed between the upper portion 100b and the lower portion 100a.

Figure 5:
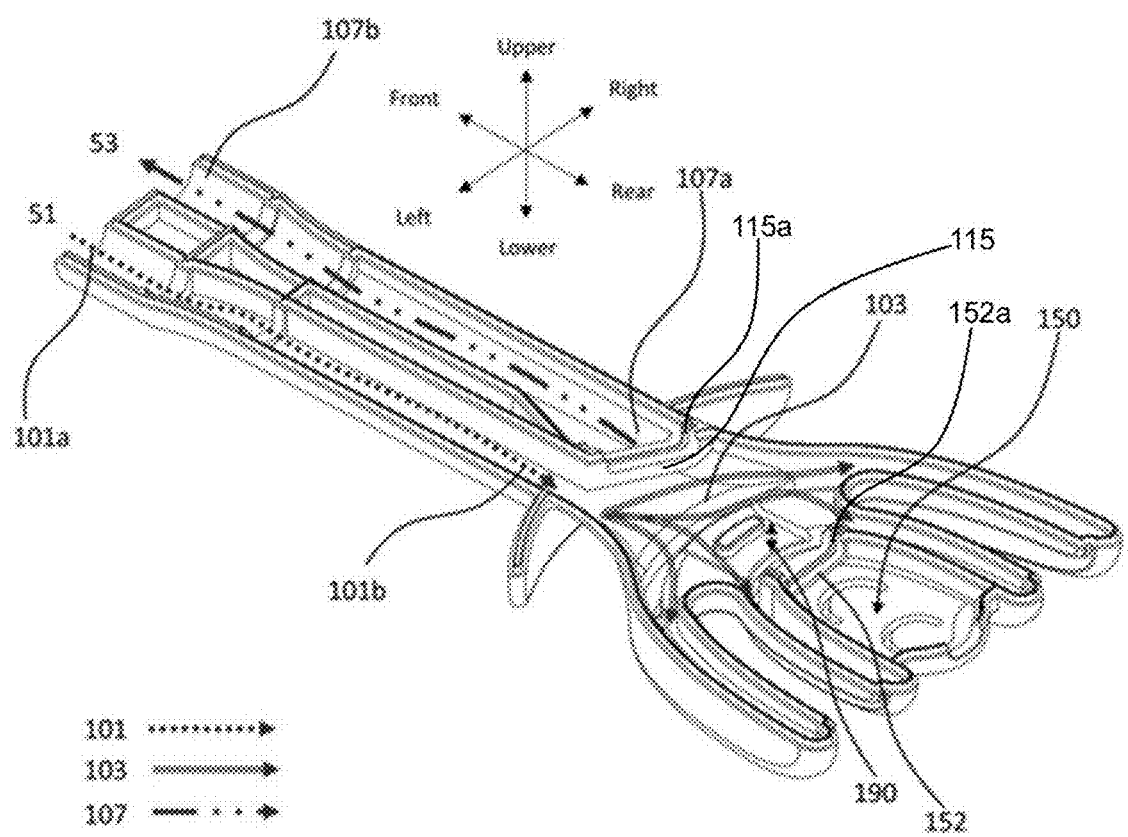
FIG. 5 is a perspective view illustrating a lower portion of the oral cavity cleaner according to the embodiment of the present disclosure.
Figure 6:
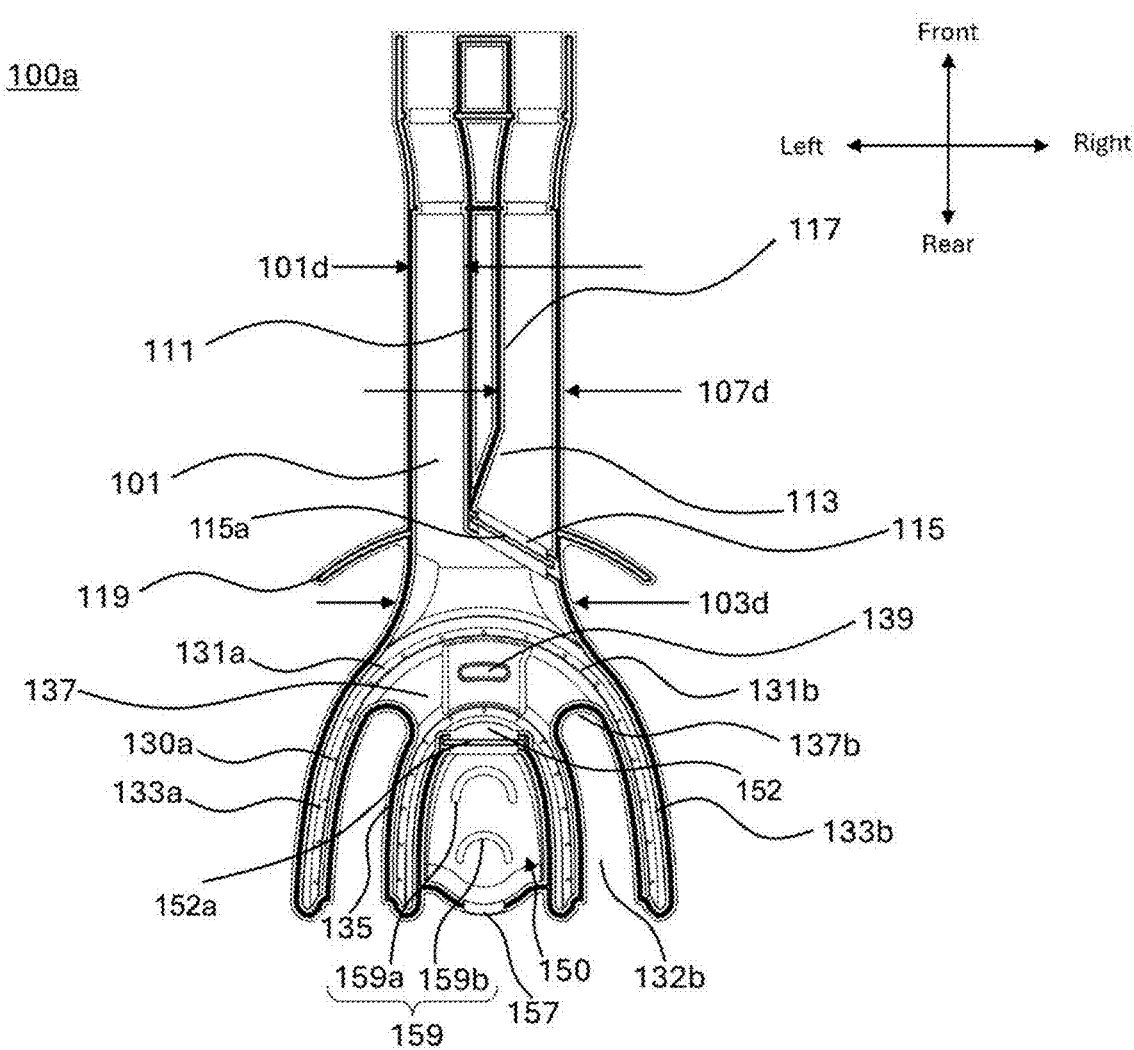
FIG. 6 is a top plan view illustrating the lower portion according to the embodiment of the present disclosure.
Figure 7A:
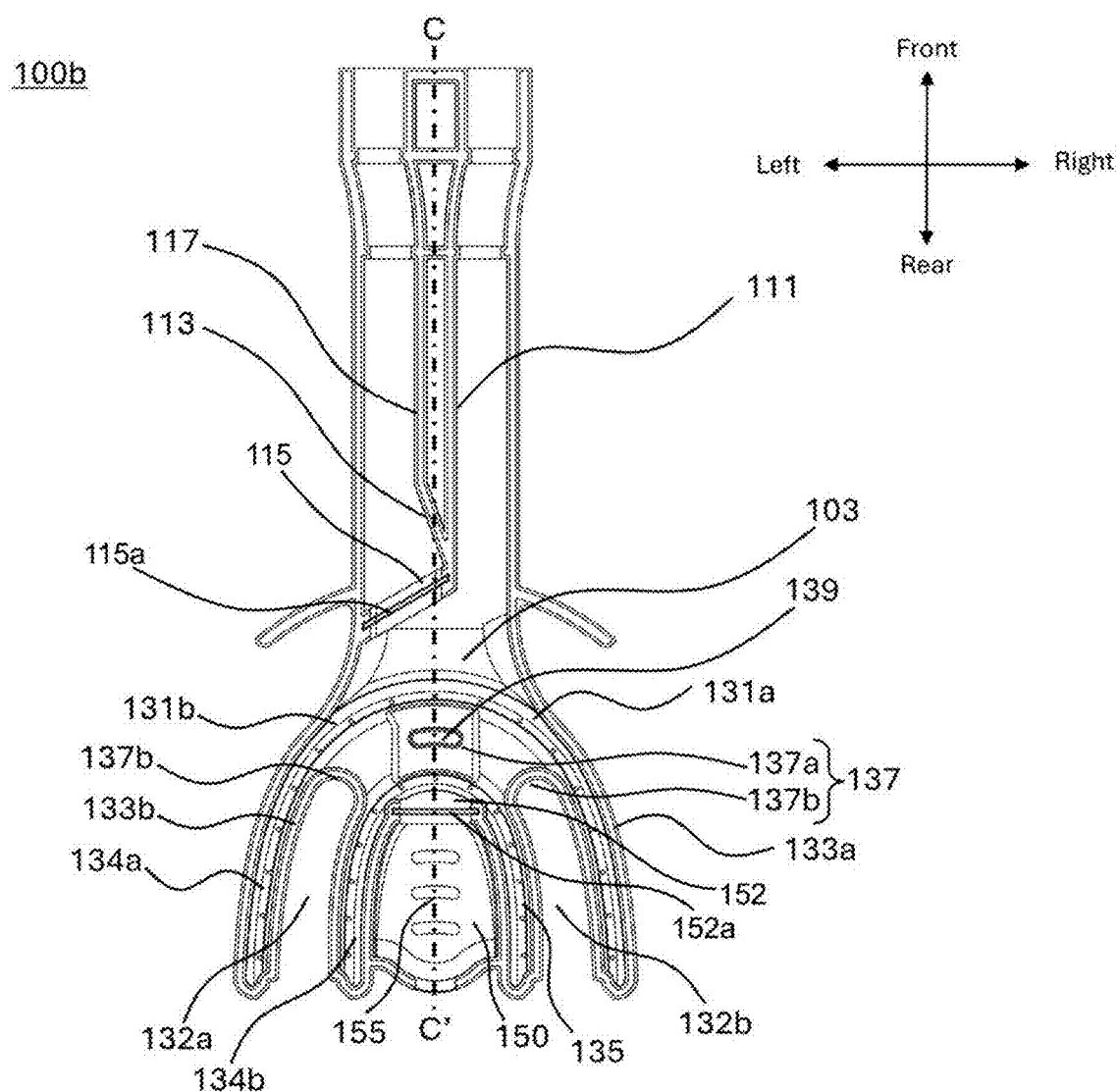
FIG. 7A is a top plan view illustrating an upper portion according to the embodiment of the present disclosure.
Figure 7B:
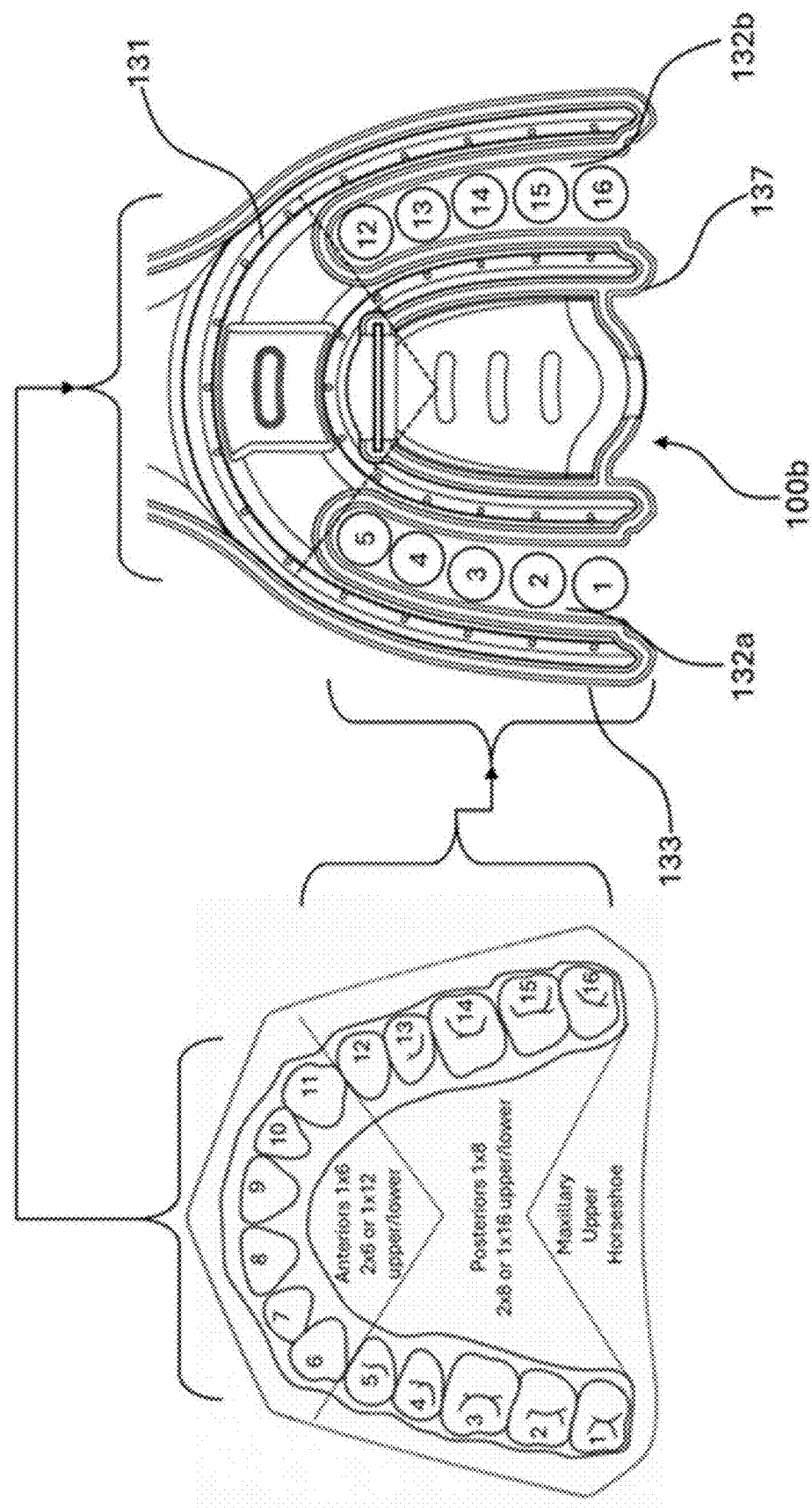
FIG. 7B is a view for explaining the upper portion in FIG. 7A in comparison with an oral cavity structure illustrated in FIG. 1.

FIG. 5 is a perspective view illustrating the lower portion 100a of the oral cavity cleaner 100 according to the embodiment of the present disclosure. FIG. 6 is a top plan view of the lower portion 100a according to the embodiment of the present disclosure. FIG. 7 is a top plan view of the upper portion 100b according to the embodiment of the present disclosure.

Referring to FIGS. 5 to 7, the oral cavity cleaner 100 according to the embodiment of the present disclosure includes: the mouthpiece 130 configured to spray the washing water 51 into an oral cavity; the core suction part 150 configured to suck the contaminated water 53, in which the washing water 51 and the saliva are mixed, from the oral cavity; and the handle 110 having an inflow path 101 through which the washing water 51 flows, a discharge flow path 107 through which the contaminated water 53 flows, and a diffusion flow path 103 configured to connect the inflow path 101 and the mouthpiece 130. A transverse width 103d of the diffusion flow path 103 is larger in size than a transverse width 101d of the inflow path 101 or a transverse width 107d of the discharge flow path 107.

The mouthpiece 130 sprays the washing water 51 into the oral cavity. The mouthpiece 130 sprays the washing water 51 toward gums and teeth. The contaminated water 53 is a mixture of the washing water 51, saliva, plaque, and waste matters. The core suction part 150 sucks the contaminated water 53. The core suction part 150 sucks the contaminated water 53 and discharges the contaminated water 53 to the handle 110. The washing water 51 supplied from the main body flows in the inflow path 101 formed in the handle 110. The inflow path 101 is formed at one side of the handle 110, and the discharge flow path 107 is formed at the other side of the handle 110. The contaminated water 53 sucked from the core suction part 150 flows in the discharge flow path 107.

The diffusion flow path 103, in which the width of the inflow path 101 is expanded, is formed at a connection point between the handle 110 and the mouthpiece 130 (a downstream side 101b of the inflow path and an upstream side 107a of the discharge flow path).

The handle 110 comprises a diffusion boundary portion 115 disposed at an upstream side 107a of the discharge flow path 107. The diffusion boundary portion 115 has a diffusion boundary groove 115a fastened to another end of the suction pipe 170 and protrudes in the handle 110 to prevent the washing water 51 flowing along the diffusion flow path 103 from being introduced into the discharge flow path 107. A diffusion restriction portion 152 is formed at the core suction part 150. The diffusion restriction portion 152 blocks an inflow of the washing water 51 flowing along the diffusion flow path 103. Also, a diffusion restriction groove 152a is formed in the diffusion restriction portion 152. The diffusion restriction groove 152a is fastened to one end of the suction pipe 170.

The washing water 51 flowing at one side of the handle 110 is uniformly dispersed to the left and right sides of the mouthpiece 130 through the diffusion flow path 103. A width of the diffusion flow path 103 is larger than a width of the downstream side 101b of the inflow path 101. The transverse width 103d of the diffusion flow path 103 is larger than a size made by summing up the transverse width 101d of the inflow path 101 and the transverse width 107d of the discharge flow path 107. A width of the diffusion flow path 103 is larger than a width of the upstream side 107a of the discharge flow path 107. The width of the diffusion flow path 103 may be equal to or larger than a size made by summing up the width of the upstream side 107a of the discharge flow path 107 and the width of the downstream side 101b of the inflow path 101.

The discharge flow path 107 is connected to a suction pipe 170 to be described below. The diffusion flow path 103 may be formed not only at the downstream side 101b of the inflow path 101, but also at the upper end and/or the lower end of the suction pipe 170. The diffusion flow path 103 traverses the suction pipe 170. For example, the inflow path 101 is formed at the left side of the handle 110, and the diffusion flow path 103 starts with the left side of the handle 110, passes through the suction pipe 170, and is formed to the right side of the handle 110.

The discharge flow path 107 is shaped to have a cross-sectional area that decreases from a rear end thereof (the upstream side 107a of the discharge flow path 107) to a front end thereof (the downstream side 107b of the discharge flow path 107). The upstream side 107a of the discharge flow path 107 is connected to the suction pipe 170. The width of the upstream side 107a of the discharge flow path 107 may decrease toward the downstream side.

A flow path guide 179 is disposed in the handle 110. The flow path guide 179 divides the washing water 51, which is discharged from the inflow path 101, at a point at which the handle 110 and the mouthpiece 130 are connected, and makes flows of the washing water 51 in different directions. The flow path guide 179 is disposed at a rear side of the downstream side 101b of the inflow path 101. The flow path guide 179 is disposed at the downstream side 101b of the inflow path 101 and divides the washing water 51. The flow path guide 179 is disposed in the diffusion flow path 103. The flow path guide 179 is disposed at the position facing the front teeth and divides the flow direction of the washing water 51 into the leftward/rightward directions based on the front teeth. The flow path guide 179 is disposed on a centerline C-C' in a longitudinal direction of the handle 110 (in the forward/rearward direction). The flow path guide 179 is disposed in front of the front teeth. The washing water 51 is divided and diffused in front of the front teeth and entirely dispersed to the mouthpiece 130. The mouthpiece 130 includes a left labial surface corresponding portion 131a and a right labial surface corresponding portion 131b formed at positions facing labial surfaces of the teeth, a left buccal surface corresponding portion 133a and a right buccal surface corresponding portion 133b formed at positions facing buccal surfaces of the teeth, and a left lingual surface corresponding portion 135a and a right lingual surface corresponding portion 135b formed at positions facing lingual surfaces of the teeth. The flow path guide 179 divides the washing water 51 to allow the washing water 51 to flow toward the left labial surface corresponding portion 131a and the right labial surface corresponding portion 131b.

The flow path guide 179 divides the supplied washing water 51 at one side of the handle 110. The washing water 51 supplied from the inflow path 101 passes through the flow path guide 179 and flows toward the labial surface corresponding portion 131. The washing water 51 passing through the labial surface corresponding portion 131 flows toward the lingual surface corresponding portion 135. Gaps are formed between the flow path guide 179 and left and right inner walls of the handle 110. A part of the washing water 51 flows toward the left labial surface corresponding portion 131a through the gap. A part of the washing water 51 flows toward the right labial surface corresponding portion 131b through an inclined surface of the flow path guide 179.

The flow path guide 179 is disposed inclinedly on the centerline C-C' in the forward/rearward direction of the mouthpiece 130 and the handle 110. The washing water 51 discharged from the inflow path 101 is diffused along the flow path guide 179 disposed on the diffusion flow path 103. The washing water 51 is diffused toward the mouthpiece 130 along the inclined surface of the flow path guide 179.

The oral cavity cleaner 100 according to the embodiment of the present disclosure includes the suction pipe 170 configured to connect the core suction part 150 and the discharge flow path 107 and define a concentration flow path 105 through which the contaminated water 53 flows. The suction pipe 170 is disposed in the diffusion flow path 103.

The diffusion flow path 103 and the concentration flow path 105 intersect each other. The suction pipe 170 connects the core suction part 150 and the discharge flow path 107. The suction pipe 170 defines the concentration flow path 105. The contaminated water 53 sucked by the core suction part 150 flows in the concentration flow path 105. The concentration flow path 105 connects the suction pipe 170 and the discharge flow path 107. The suction pipe 170 is disposed in the diffusion flow path 103, and the washing water 51 is diffused to the entire mouthpiece 130 through the upper end and/or the lower end of the suction pipe 170. The upper ends and/or the lower ends of the mouthpiece 130 and the suction pipe 170 are spaced apart from one another, and a detailed description thereof will be described below.

The oral cavity cleaner according to the embodiment of the present disclosure includes: the mouthpiece 130 configured to spray the washing water 51 into the oral cavity; the core suction part 150 configured to suck the contaminated water 53, which is made by mixing the washing water 51 and the saliva, from the inside of the oral cavity; and the handle 110 having the inflow path 101 through which the washing water 51 flows, the diffusion flow path 103 configured to connect the inflow path 101 and the mouthpiece 130, and the discharge flow path 107 through which the contaminated water 53 discharged from the core suction part 150 flows. The handle 110 includes: an inflow partition wall 111 configured to define the inflow path 101; a discharge partition wall 117 disposed to be spaced apart from the inflow partition wall 111 and configured to define the discharge flow path 107; and a connection partition wall 113 connected to a rear end of the discharge partition wall 117 and a rear end of the inflow partition wall 111.

The inflow partition wall 111 extends from an upstream side 101a of the inflow path 101 to a downstream side 101b of the inflow path 101. The connection partition wall 113 is connected to the inflow partition wall 111. The connection partition wall 113 extends to a front side of the diffusion flow path 103. The connection partition wall 113 is disposed at the upstream side 107a of the discharge flow path 107.

The connection partition wall 113 extends forward from the upstream side 107a of the discharge flow path 107 and is connected to the discharge partition wall 117. The connection partition wall 113 is disposed to be inclined with respect to the centerline C-C' in the forward/rearward direction of the handle 110. The connection partition wall 113 widens the upstream side 107a of the discharge flow path 107.

The connection partition wall 113 makes the width of the upstream side 107a of the discharge flow path 107 larger than the width of the downstream side 101b of the inflow path 101. The connection partition wall 113 is disposed to be inclined.

The handle 110 may include the connection partition wall 113 disposed in an oblique direction so that a cross-sectional area of the discharge flow path 107 decreases from a rear end (an upstream side) thereof to a front end (a downstream side) thereof.

The handle 110 includes the connection partition wall 113 configured to connect the discharge partition wall 117 and the inflow partition wall 111 and disposed to be inclined with respect to the centerline C-C' in the forward/rearward direction of the handle 110. The connection partition wall 113 linearly decreases the width of the discharge flow path 107 from a rear side (an upstream side) thereof to a front side (a downstream side) thereof. The connection partition wall 113 mitigates impact caused by the contaminated water 53 rapidly introduced from the suction pipe 170. The connection partition wall 113 reduces vibration generated from the handle 110.

The oral cavity cleaner according to the embodiment of the present disclosure includes the suction pipe 170 including: a front channel 171 connected to the discharge flow path 107; a rear channel 173 connected to the core suction part 150; and a bending channel 175 disposed to be inclined with respect to the centerline C-C' in the forward/rearward direction of the handle 110 and configured to connect the rear channel 173 and the front channel 171. A direction in which the connection partition wall 113 is inclined may be identical to a direction in which the bending channel 175 is inclined. The contaminated water 53 may collide with the inclined surface of the bending channel 175 and be concentrated at one side in the transverse direction.

When the flow of the contaminated water 53 is rapidly changed when a suction pump operates or stops, a pressure and a flow velocity may be rapidly changed, and water hammering may occur. Since the pump simultaneously sucks the contaminated water 53 and the air existing in the oral cavity, the mixture of the air and the contaminated water 53 flows in the discharge flow path 107 and the suction pipe 170. The environment in which the air and the contaminated water 53 flow together generates water hammering in the handle 110. The connection partition wall 113 mitigates the water hammering by reducing a part of the discharge flow path 107 where vacuum occurs and gradually decreasing a flow path width of the contaminated water 53.

Figure 8:
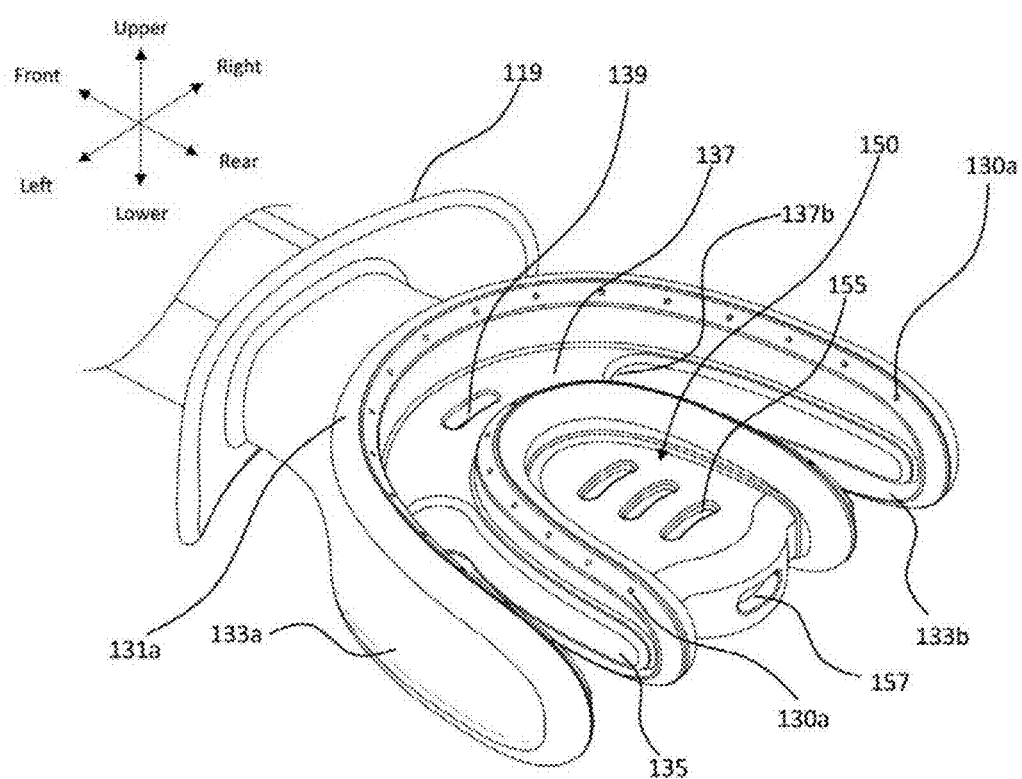
FIG. 8 is an enlarged view of a mouthpiece of the oral cavity cleaner illustrated in FIG. 3.
Figure 9:
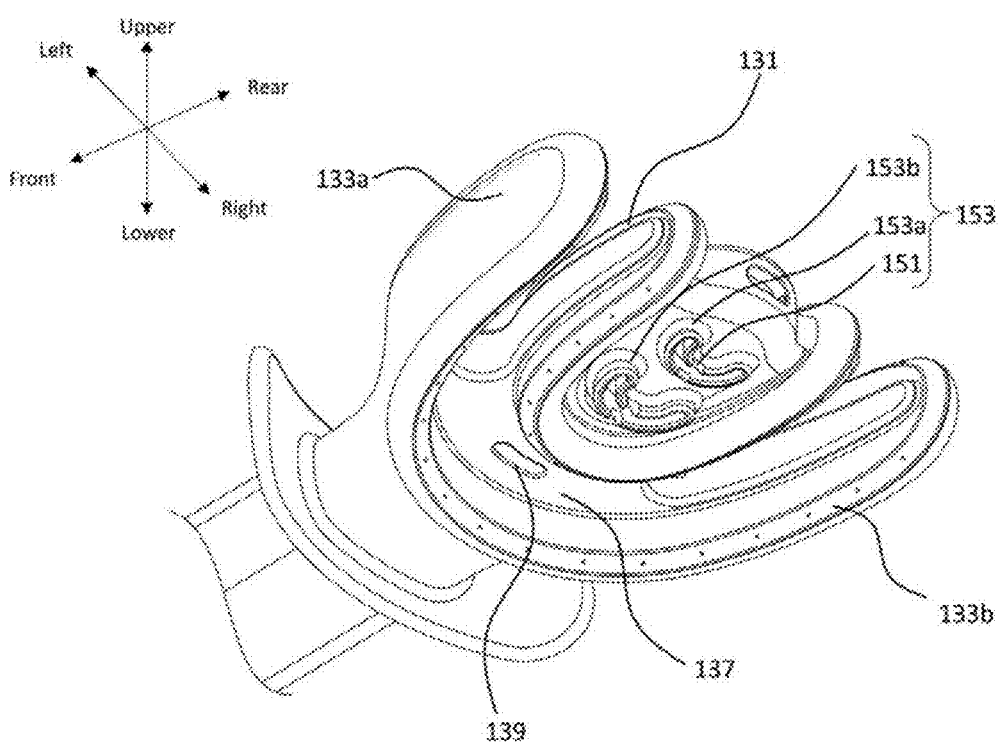
FIG. 9 is a view illustrating a lower side of the part in FIG. 8.

FIG. 8 is an enlarged view of the mouthpiece 130 of the oral cavity cleaner 100 illustrated in FIG. 3. FIG. 9 is a view illustrating a lower side of the part in FIG. 8.

Referring to FIGS. 8 to 9, the oral cavity cleaner 100 according to the embodiment of the present disclosure includes: the handle 110 having the inflow path 101 through which the washing water 51 flows and the discharge flow path 107 through which the contaminated water 53 sucked from the oral cavity flows; the mouthpiece 130 configured to spray the washing water 51 supplied through the handle 110 into the oral cavity; and the core suction part 150 configured to suck the contaminated water 53, which has been discharged from the mouthpiece 130 and washed the teeth, and having an edge surrounded by the mouthpiece 130. The core suction part 150 sucks the contaminated water 53. The suction pipe 170 is connected to the core suction part 150 and sucks the contaminated water 53. The suction pipe 170 is connected to the handle 110. The discharge flow path 107 is connected to the suction pipe 170.

The core suction part 150 is fixed to the mouthpiece 130. The core suction part 150 is disposed on the centerline C-C' of the mouthpiece 130. The core suction part 150 is disposed at a center of the mouthpiece 130. A surface of the core suction part 150 and a surface of the mouthpiece 130, which are coupled to each other, are curved in a 'U' shape. An inner side of the mouthpiece 130 is formed in a 'U' shape. The core suction part 150 is formed in an approximately circular or elliptical shape and coupled to the inner side of the mouthpiece 130.

The mouthpiece 130 includes the labial surface corresponding portion 131 formed at the position facing the labial surfaces of the teeth, the buccal surface corresponding portion 133 formed at the position facing the buccal surfaces of the teeth, and the lingual surface corresponding portion 135 formed at the position facing the lingual surfaces of the teeth. The core suction part 150 is surrounded by the lingual surface corresponding portion 135 and disposed on a user's tongue. The lingual surface corresponding portion 135 protects weak epithelial cells in the oral cavity from the suction force of the core suction part 150.

The core suction part 150 is disposed on the user's tongue. The core suction part 150 is disposed at a center of the tongue. Very thin epithelial cells are present in the oral cavity. The tongue has the strongest muscle in the oral cavity. The core suction part 150 disposed on the tongue sucks the contaminated water. There is a low likelihood that the tongue is injured even though the tongue is attached to the core suction part 150. Because the tongue has a plurality of lingual papillae, a plurality of air passageways and/or a plurality of contaminated water passageways is formed between the core suction part 150 and the lingual papillae.

An outer side of the mouthpiece 130 defines the labial surface corresponding portion 131 and the buccal surface corresponding portion 133, and an inner side of the mouthpiece 130 defines the lingual surface corresponding portion 135. An intermediation portion 137 to be described below connects the lingual surface corresponding portion 135 and the labial surface corresponding portion 131. The core suction part 150 has lower suction holes 159 formed at positions facing the tongue. The lower suction hole 159 is formed to face the tongue. The lower suction hole 159 is formed at a lower side of the core suction part 150. The core suction part 150 has suction guide portions 153 protruding from an edge of the lower suction hole 159 and configured to guide the contaminated water 53 to the lower suction hole 159.

The suction guide portion 153 prevents the tongue from blocking the lower suction hole 159. The suction guide portion 153 separates the lower suction hole 159 from the tongue. The suction guide portion 153 serves as a straw for sucking the contaminated water 53 existing on the tongue. The suction guide portion 153 is immersed in the washing water 51 or generates the negative pressure at a distance adjacent to the washing water 51.

The lower suction holes 159 include a first lower suction hole 159*a* and a second lower suction hole 159*b* formed at a rear side of the first lower suction hole 159*a*. A first suction guide portion 153*a* formed in the first lower suction hole 159*a* protrudes to be higher than a second suction guide portion 153*b* formed in the second lower suction hole 159*b*. The first suction guide portion 153*a* formed in the first lower suction hole 159*a* is formed to be higher than the lingual surface corresponding portion 135. The first suction guide portion 153*a* prevents the user's tongue from coming into direct contact with the lingual surface corresponding portion 135. The first suction guide portion 153*a* separates the user's tongue from the lingual surface corresponding portion 135.

The contaminated water 53 may flow between the user's tongue and the lingual surface corresponding portion 135. The suction guide portion 153 has a trough 151 along which the contaminated water 53 flows forward. The trough 151 is a gap through which the contaminated water 53 may be sucked even though the suction guide portion 153 is in close contact with the tongue. The trough 151 may be formed forward, i.e., in a direction toward a lip.

The core suction part 150 includes the suction guide portion 153 protruding downward from the edge of the lower suction hole 159 and having a 'U' shape. The suction guide portion 153 has a protruding surface directed forward, and a recessed surface directed rearward, i.e., toward the uvula. A height of the suction guide portion 153 may decrease in a stepwise manner from a front side thereof to a rear side thereof, i.e., in a direction from the mouth to the uvula. Typically, the height of the suction guide portion 153 is maximally adjacent to the tongue because the height of the suction guide portion 153 gradually increases in a direction from the tongue end to the tongue root in consideration of the shape of the tongue.

The core suction part 150 includes the suction guide portion 153 having a shape protruding forward and recessed rearward and formed at the edge of the lower suction hole 159. The core suction part 150 has a rear suction hole 157 formed at a position facing the uvula. The rear suction hole 157 is formed at a rear side of the core suction part 150. The rear suction hole 157 sucks the contaminated water 53 in the vicinity of the uvula. The core suction part 150 has the upper suction hole 155 formed at the position facing the palate. The upper suction hole 155 is formed at an upper side of the core suction part 150. The upper suction hole 155 sucks the contaminated water 53 which falls after being sprayed toward an upper jaw.

The oral cavity cleaner 100 according to the embodiment of the present disclosure includes: the handle 110 having the inflow path 101 through which the washing water 51 flows and the discharge flow path 107 through which the contaminated water 53 sucked from the oral cavity flows; the mouthpiece 130 configured to spray the washing water 51 supplied through the handle 110 into the oral cavity; and the core suction part 150 configured to suck the contaminated water 53, which has been discharged from the mouthpiece 130 and washed the teeth, and connected to the mouthpiece 130. The contaminated water 53 flows in the core suction part 150, and the washing water 51 flows in the mouthpiece 130.

The mouthpiece 130 and the core suction part 150 are isolated to prevent the washing water 51 and the contaminated water 53 from being mixed. The core suction part 150 has a center disposed on the median sulcus of the user's tongue. The core suction part 150 is disposed on the dorsum of the user's tongue. A lower end of the core suction part 150 is formed at a position higher than a lower end of the mouthpiece 130, and an upper end of the core suction part 150 is formed to be lower than an upper end of the mouthpiece 130.

The core suction part 150 is disposed on the tongue and lower in height than the mouthpiece 130. Therefore, the probability that the user's tongue or palate comes into contact with the core suction part 150 is decreased. A lateral periphery of the core suction part 150 is connected to the mouthpiece 130. The edge of the core suction part 150 is connected to the lingual surface corresponding portion 135, and the lingual surface corresponding portion 135 is higher in height than the core suction part 150. The upper suction hole 155 is formed at the upper side of the core suction part 150. The mouthpiece 130 surrounds the edge of the core suction part 150. The mouthpiece 130 prevents the core suction part 150 from coming into contact with the user's buccal portion. The structure protects the user's weak oral mucosa.

The core suction part 150 has the lower suction hole 159 formed at the position facing the tongue, the upper suction hole 155 formed at the position facing the palate, and the rear suction hole 157 formed at the position facing the uvula. The lower suction hole 159, the upper suction hole 155, and the rear suction hole 157 are formed in a row in the forward/rearward direction. The lower suction hole 159, the upper suction hole 155, and the rear suction hole 157 are concentrated at the center of the user's oral cavity, and the mouthpiece 130 allows these holes to be spaced apart from the oral mucosa at a predetermined distance. Therefore, it is possible to prevent the oral mucosa from being sucked into the holes and blocking the holes. The structure constantly maintains the function of sucking the contaminated water 53.

In the mouthpiece 130, the front suction hole 139 is formed at the portion facing the occlusal surfaces of the front teeth. In the core suction part 150, the lower suction hole 159 is formed at the position facing the tongue, the upper suction hole 155 is formed at the position facing the palate, and the rear suction hole 157 is formed at the position facing the uvula. The front suction hole 139, the lower suction hole 159, the upper suction hole 155, and the rear suction hole 157 are formed in a row on the centerline C-C' in the forward/rearward direction.

The front suction hole 139 is formed at the position adjacent to the lip. The front suction hole 139 sucks the contaminated water 53 existing in the vicinity of the lip. The front suction hole 139 is formed in the intermediation portion 137 to be described below. The intermediation portion 137 is formed at the position adjoining the occlusal surfaces of the front teeth. The front suction hole 139 may be formed at the upper side and/or the lower side of the mouthpiece 130.

The oral cavity cleaner 100 according to the embodiment of the present disclosure includes: the handle 110 having the inflow path 101 through which the washing water 51 flows and the discharge flow path 107 through which the contaminated water 53 sucked from the oral cavity flows; the mouthpiece 130 configured to spray the washing water 51 supplied through the handle 110 into the oral cavity, the mouthpiece 130 having the labial surface corresponding portion 131 formed at the position facing the labial surfaces of the teeth, the buccal surface corresponding portion 133 formed at the position facing the buccal surfaces of the teeth, and the left lingual surface corresponding portion 135a and the right lingual surface corresponding portion 135b formed at the position facing the lingual surfaces of the teeth; and the core suction part 150 configured to suck the contaminated water 53, which has been discharged from the mouthpiece 130 and washed the teeth, and having the left side coupled to the left lingual surface corresponding portion 135a and the right side coupled to the right lingual surface corresponding portion 135b.

The core suction part 150 is surrounded by the lingual surface corresponding portion 135. The core suction part 150 is spaced apart from the user's oral mucosa. The rear end of the core suction part 150 is disposed forward from the rear end of the buccal surface corresponding portion 133. The rear end of the core suction part 150 is disposed forward from the rear end of the lingual surface corresponding portion 135. The rear end of the core suction part 150 protrudes to a smaller extent than the mouthpiece 130, and as a result, the rear end of the core suction part 150 does not interfere with the uvula.

Figure 10:
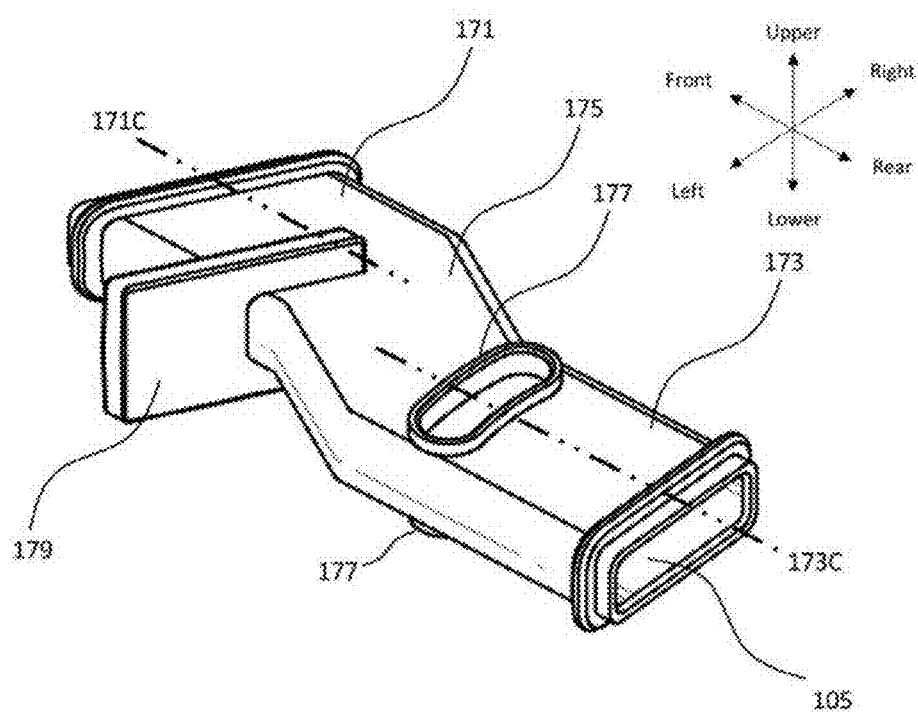
FIG. 10 is a perspective view of a suction pipe according to the embodiment of the present disclosure.
Figure 11:
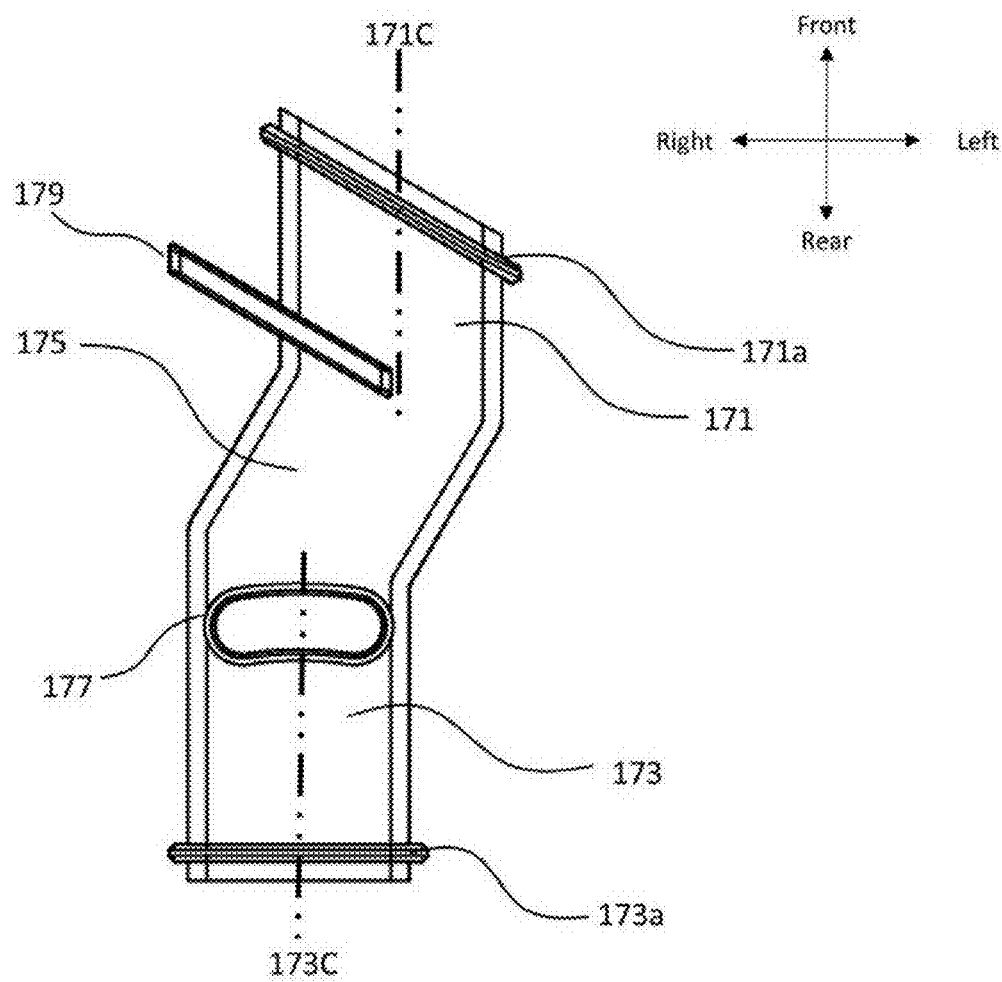
FIG. 11 is a top plan view of the suction pipe according to the embodiment of the present disclosure.
Figure 12:
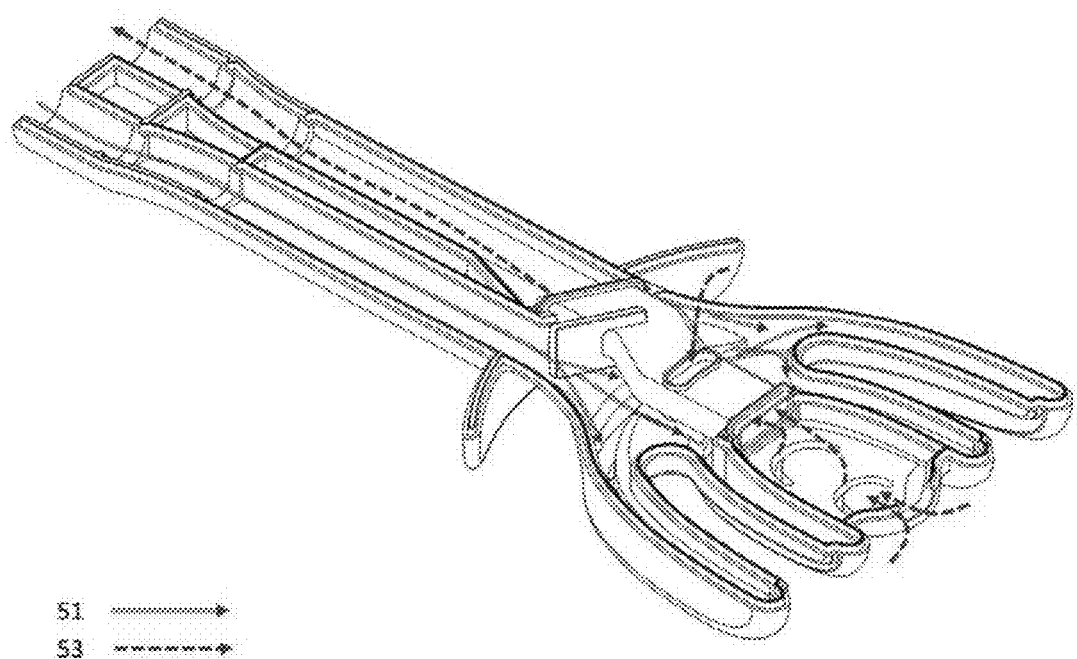
FIG. 12 is a perspective view illustrating a state in which the suction pipe is coupled to the lower portion illustrated in FIG. 4.
Figure 13:
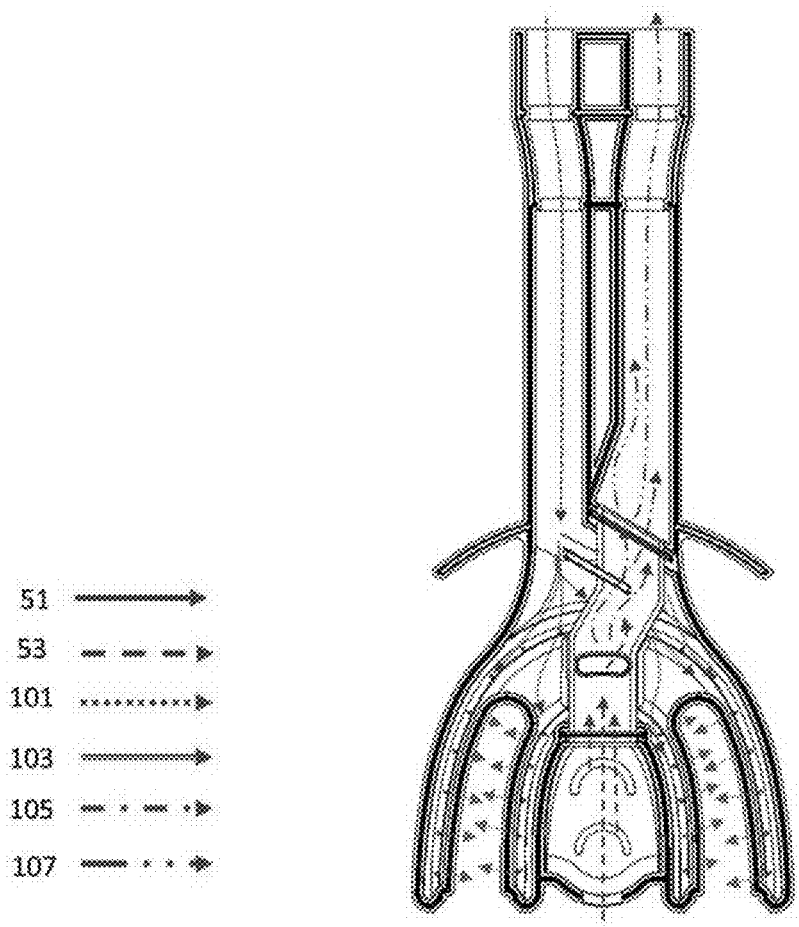
FIG. 13 is a top plan view illustrating a state in which the suction pipe is coupled to the lower portion illustrated in FIG. 6.
Figure 14:
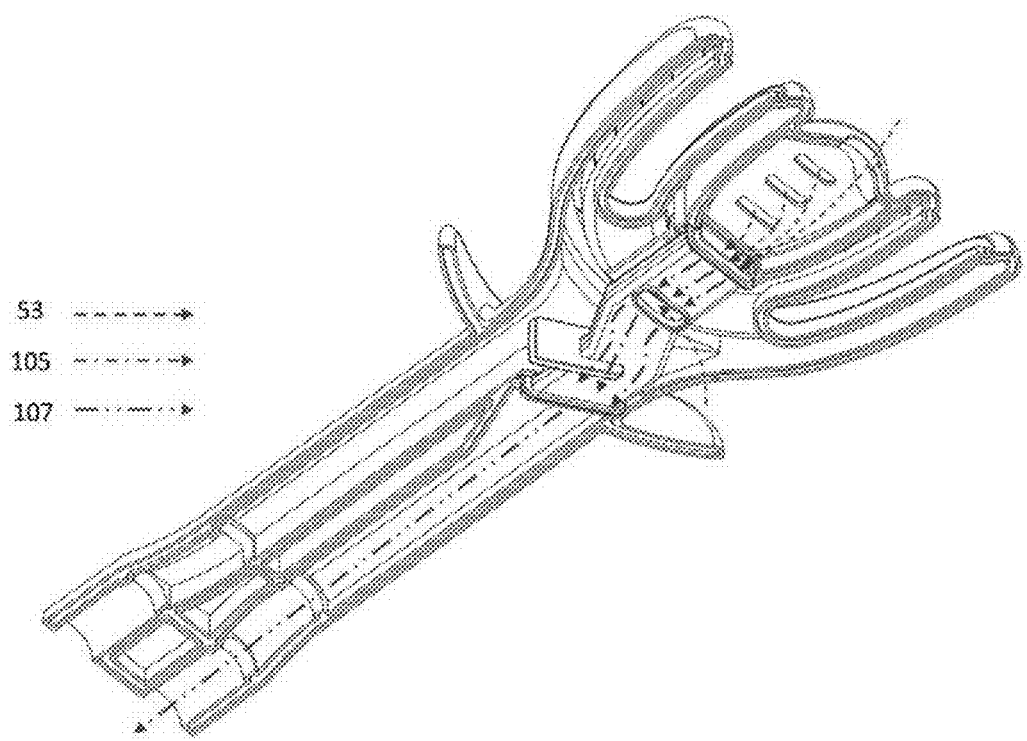
FIG. 14 is a perspective view illustrating a state in which the suction pipe is coupled to the upper portion illustrated in FIG. 7.

FIG. 10 is a perspective view of the suction pipe 170 according to the embodiment of the present disclosure. FIG. 11 is a top plan view of the suction pipe 170 according to the embodiment of the present disclosure. FIG. 12 is a perspective view illustrating a state in which the suction pipe 170 is coupled to the lower portion 100a illustrated in FIG. 4. FIG. 13 is a top plan view illustrating a state in which the suction pipe 170 is coupled to the lower portion 100a illustrated in FIG. 6. FIG. 14 is a perspective view illustrating a state in which the suction pipe 170 is coupled to the upper portion 100b illustrated in FIG. 7.

Referring to FIGS. 10 to 14, the oral cavity cleaner 100 according to the embodiment of the present disclosure includes: the handle 110 having the inflow path 101 through which the washing water 51 flows and the discharge flow path 107 through which the contaminated water 53 sucked from the oral cavity flows; the mouthpiece 130 connected to the inflow path 101 and configured to spray the washing water 51 into the oral cavity; the core suction part 150 configured to suck the contaminated water 53 which has been discharged from the mouthpiece 130 and washed the teeth; and the suction pipe 170 configured to connect the core suction part 150 and the handle 110, penetrate the mouthpiece 130, and allow the contaminated water 53 to flow therethrough.

The suction pipe 170 penetrates the mouthpiece 130. The contaminated water 53 flows from the core suction part 150 to the suction pipe 170. The suction pipe 170 is connected to the discharge flow path 107. The suction pipe 170 penetrates the mouthpiece 130 and is connected to the handle 110. The washing water 51 flows in the mouthpiece 130. The suction pipe 170 separate the washing water 51 from the contaminated water 53.

Figure 19:
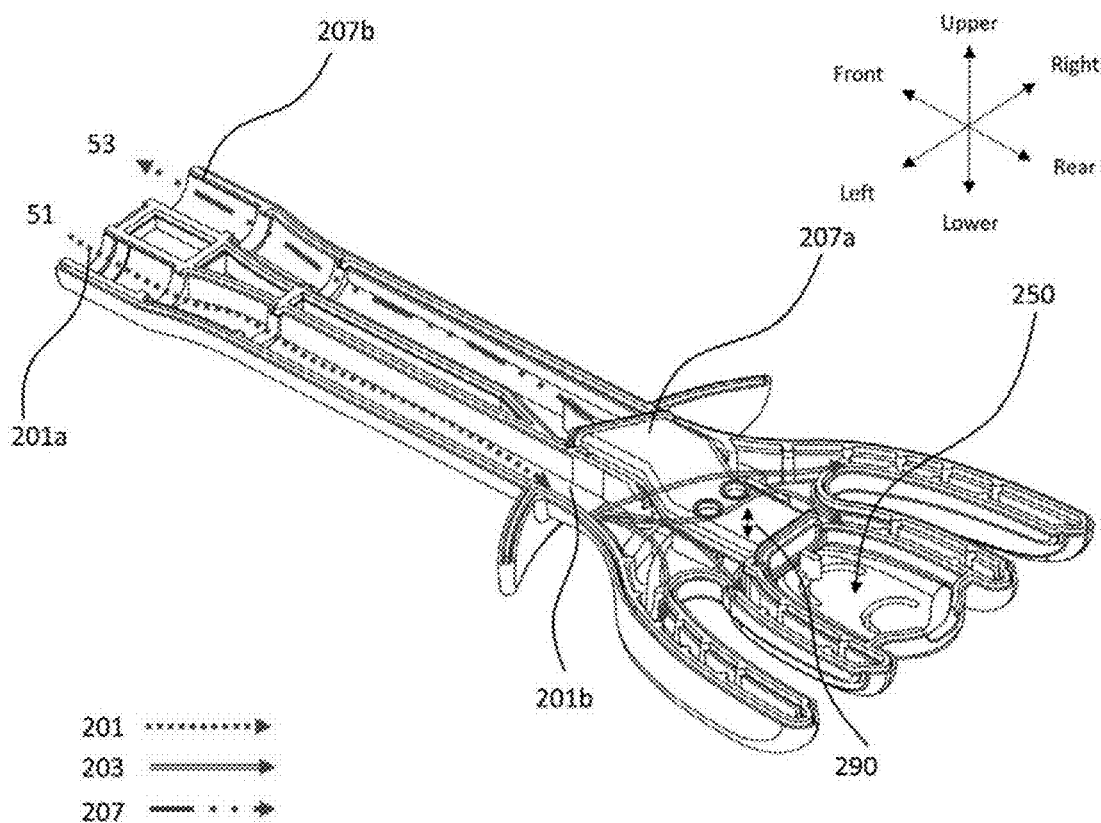
FIG. 19 is a perspective view of a lower portion of the oral cavity cleaner according to another embodiment of the present disclosure.

The mouthpiece 130 includes the left labial surface corresponding portion 131*a* and the right labial surface corresponding portion 131*b* formed at the positions facing the labial surfaces of the teeth, the left buccal surface corresponding portion 133*a* and the right buccal surface corresponding portion 133*b* formed at the positions facing the buccal surfaces of the teeth, and the lingual surface corresponding portion 135 formed at the position facing the lingual surfaces of the teeth. The suction pipe 170 penetrates the labial surface corresponding portion 131 and the lingual surface corresponding portion 135 and is connected to the core suction part 150. The core suction part 150 is surrounded by the lingual surface corresponding portion 135. The handle 110 is connected to the labial surface corresponding portion 131. The suction pipe 170 penetrates the mouthpiece 130 and is connected to the handle 110. The suction pipe 170 includes vertical channels 177 protruding in a longitudinal direction thereof and configured to define a flow interval 190 or 290 from the mouthpiece 130 in the longitudinal direction. FIGS. 5 and 19 illustrate the flow interval 190 or 290. The vertical channel 177 is formed at an upper end and/or a lower end of the suction pipe 170.

The mouthpiece 130 has the front suction hole 139 formed at the position facing the occlusal surfaces of the user's front teeth and configured to suck the contaminated water 53, and the vertical channel 177 communicates with the front suction hole 139 and defines the vertical flow path. The contaminated water 53 collected in the direction toward the front teeth moves to the vertical channel 177 through the front suction hole 139. The contaminated water 53, which is introduced into the suction pipe 170 through the vertical channel 177, flows to the handle 110. The mouthpiece 130 includes vertical protrusions 137*a* fastened to the vertical channel 177 and configured to define the flow interval 190 or 290.

The flow interval 190 defines the diffusion flow path 103 through which the washing water 51 flows across the suction pipe 170. The mouthpiece 130 includes therein the vertical protrusion 137*a* protruding in a longitudinal direction thereof and configured to define the flow interval 190 or 290 from the suction pipe 170 in the longitudinal direction. The vertical protrusion 137*a* and the vertical channel 177 are fastened to each other. The vertical channel 177 and the vertical protrusion 137*a* define spaces between the mouthpiece 130 and the suction pipe 170. The spaces are the flow interval 190 or 290. The washing water 51 flows to the upper side and/or the lower side of the suction pipe 170 through the flow interval 190 or 290. The washing water 51 flows through the flow interval 190 or 290 in a direction opposite to the suction pipe 170.

The suction pipe 170 includes the front channel 171 connected to the discharge flow path 107 of the handle 110; and the rear channel 173 penetrating the rear side of the mouthpiece 130 and connected to the core suction part 150.

The suction pipe 170 is detachably formed and disposed in the diffusion flow path 103. The suction pipe 170 includes the bending channel 175 disposed to be inclined with respect to a centerline 173C of the rear channel 173 and a centerline 171C of the front channel 171 and configured to connect the rear channel 173 and the front channel 171. The bending channel 175 penetrates the front side of the mouthpiece 130 and connected to the front channel 171.

The centerline of the rear channel 173 and the centerline of the front channel 171 are parallel to each other. The inflow path 101 is formed at one side of the handle 110, the discharge flow path 107 is formed at the other side of the handle 110, and the core suction part 150 is disposed on the centerline C-C' of the handle 110. The suction pipe 170 includes: the rear channel 173 connected to the core suction part 150; and the front channel 171 connected to the discharge flow path 107.

The oral cavity cleaner 100 according to the embodiment of the present disclosure includes the suction pipe 170 configured to connect the core suction part 150 and the discharge flow path 107.

The suction pipe 170 includes the bending channel 175 disposed to be inclined at an angle with respect to the centerline C-C' of the handle 110 and configured to connect the rear channel 173 and the front channel 171. The bending channel 175 defines a curved route for the contaminated water 53.

Since the core suction part 150 is disposed on the centerline C-C' of the handle 110 and the discharge flow path 107 is disposed at one side of the handle 110, there is a need for a means for defining a curved route for the contaminated water 53. The front channel 171 is formed in parallel with the flow direction of the discharge flow path 107. The contaminated water 53 flows inside the suction pipe 170, the washing water 51 flows outside the suction pipe 170, and the flow path guide 179 is disposed on an outer peripheral surface of the suction pipe 170 and divides the washing water 51 into different directions. The diffusion flow path 103 is formed at the connection point between the handle 110 and the mouthpiece 130.

The front channel 171 and the bending channel 175 may be disposed in the diffusion flow path 103. The flow path guide 179 may protrude in the upward/downward direction and define the flow interval 190 or 290. The flow path guide 179 separates the suction pipe 170 from the mouthpiece 130.

The flow interval 190 or 290 is a space between the mouthpiece 130 and the suction pipe 170. The flow path guide 179 is disposed in the diffusion flow path 103. The drawings illustrate that the flow path guide 179 and the suction pipe 170 are integrated, but the flow path guide 179 may be formed in the handle 110. The suction pipe 170 includes the flow path guide 179 configured to divide the inflow path 101 to allow the washing water 51 to flow in the different directions.

The washing water 51 introduced from one side of the handle 110 flows toward the other side of the handle 110 along the flow path guide 179. When the inflow path 101 is formed at the left side of the handle 110, the washing water 51 discharged from the left side of the handle 110 flows toward the left buccal surface corresponding portion 133*a* and the left lingual surface corresponding portion 135*a*. The flow path guide 179 is obliquely disposed at the rear side of the inflow path 101 so that a part of the washing water 51 flows toward the right labial surface corresponding portion 131*b*. The flow path guide 179 is obliquely disposed at the rear side of the inflow path 101 so that a part of the washing water 51 flows toward the right buccal surface corresponding portion 133b.

The oral cavity cleaner 100 according to the embodiment of the present disclosure includes the handle 110 having the inflow path 101 through which the washing water 51 flows and the discharge flow path 107 through which the contaminated water 53 sucked from the oral cavity flows; the mouthpiece 130 connected to the inflow path 101 and configured to spray the washing water 51 into the oral cavity; the core suction part 150 configured to suck the contaminated water 53 that has been discharged from the mouthpiece 130 and washed the teeth; and the suction pipe 170 configured to connect the core suction part 150 and the handle 110, including the concentration flow path 105 disposed in the suction pipe 170 and configured to allow the contaminated water 53 to flow therein, and defining the flow interval 190 or 290 disposed outside the suction pipe 170, provided between the suction pipe 170 and the mouthpiece 130, and configured to allow the washing water 51 to flow therein.

The suction pipe 170 includes the vertical channels 177 protruding in the longitudinal direction thereof and configured to define the flow interval 190 or 290 from the mouthpiece 130 in the longitudinal direction. The mouthpiece 130 includes the vertical protrusions 137a fastened to the vertical channel 177 and configured to define the flow interval 190 or 290. The flow interval 190 or 290 defines the diffusion flow path 103 through which the washing water 51 flows across the suction pipe 170. The mouthpiece 130 includes therein the vertical protrusion 137a protruding in the longitudinal direction thereof and configured to define the flow interval 190 or 290 from the suction pipe 170 in the longitudinal direction.

The suction pipe 170 is disposed in the diffusion flow path 103. The contaminated water 53 flows in the suction pipe 170. The washing water 51 flows outside the suction pipe 170. The flow interval 190 or 290 is formed between the upper ends and/or the lower ends of the suction pipe 170 and the mouthpiece 130. The washing water 51 flows through the flow interval 190 or 290 in a direction opposite to the suction pipe 170.

The vertical protrusion 137a and the vertical channel 177 define the flow interval 190 or 290. The vertical protrusion 137a and the vertical channel 177 may be coupled to each other to define the flow interval 190 or 290. The vertical protrusion 137a may be formed at the edge of the front suction hole 139 and connect the front suction hole 139 and the vertical channel 177.

Referring back to FIGS. 8 and 9, the oral cavity cleaner 100 according to the embodiment of the present disclosure includes: the handle 110 having the inflow path 101 through which the washing water 51 flows; and the mouthpiece 130 having spray holes 130a configured to spray the washing water 51 into the oral cavity. The mouthpiece 130 includes: the labial surface corresponding portion 131 formed at the position facing the labial surfaces of the teeth; the buccal surface corresponding portion 133 connected to the labial surface corresponding portion 131 and formed at the position facing the buccal surfaces of the teeth; the lingual surface corresponding portion 135 formed at the position facing the lingual surfaces of the teeth; and the intermediation portion 137 configured to connect the labial surface corresponding portion 131 and the lingual surface corresponding portion 135 and having two opposite ends starting from the connection point between the labial surface corresponding portion 131 and the lingual surface corresponding portion 135.

The intermediation portion 137 connects a rear surface of the labial surface corresponding portion 131 and a front surface of the lingual surface corresponding portion 135. A front side of the intermediation portion 137 is connected to the labial surface corresponding portion 131. A rear side of the intermediation portion 137 is connected to the lingual surface corresponding portion 135. A left end of the intermediation portion 137 is connected to a boundary between the left labial surface corresponding portion 131a and the left buccal surface corresponding portion 133a. A right end of the intermediation portion 137 is connected to a boundary between the right labial surface corresponding portion 131b and the right buccal surface corresponding portion 133b. The lingual surface corresponding portion 135 is formed at the front side of the intermediation portion 137, and the labial surface corresponding portion 131 is formed at the rear side of the intermediation portion 137. The intermediation portion 137 sucks the contaminated water 53 distributed around the front teeth.

The mouthpiece 130 includes the buccal surface corresponding portion 133 connected to the labial surface corresponding portion 131 and formed at the positions facing the buccal surfaces of the teeth. In the space between the lingual surface corresponding portion 135 and the buccal surface corresponding portion 133, a first shrinkable hole 132a is formed such that all regions of the occlusal surfaces of the first, second, third, and fourth teeth define vacant spaces, and a second shrinkable hole 132b is formed such that all regions of the occlusal surfaces of the thirteenth, fourteenth, fifteenth, and sixteenth teeth define vacant spaces.

The first shrinkable hole 132a and the second shrinkable hole 132b each are formed as a single hole. The first shrinkable hole 132a and the second shrinkable hole 132b defines a boundary with the intermediation portion 137, the lingual surface corresponding portion 135, and the buccal surface corresponding portion 133. A rear end of the buccal surface corresponding portion 133 defines a free end.

An outer spray flow path 134a is formed in the labial surface corresponding portion 131 and the buccal surface corresponding portion 133, an inner spray flow path 134b is formed in the lingual surface corresponding portion 135, and a diffusion flow path 103 for connecting the outer spray flow path 134a and the inner spray flow path 134b is formed in the intermediation portion 137. The diffusion flow path 103 is formed in the intermediation portion 137 and at the connection point between the handle 110 and the mouthpiece 130. The washing water 51 introduced into the diffusion flow path 103 is dispersed to all the points on the mouthpiece 130. The diffusion flow path 103 connects the handle 110, the labial surface corresponding portion 131, the lingual surface corresponding portion 135, and the buccal surface corresponding portion 133. One end of the buccal surface corresponding portion 133 is fixed to the labial surface corresponding portion 131, and the other end of the buccal surface corresponding portion 133 is formed as a free end. Lateral ends 137b of the intermediation portion 137 each have a shape recessed toward the center to enable the buccal surface corresponding portion 133 to elastically move in a direction toward the labial surface corresponding portion 131. The lateral end 137b of the intermediation portion 137 is curved in a 'C' shape so that the buccal surface corresponding portion 133 may elastically move in the direction toward the labial surface corresponding portion 131. One end of the buccal surface corresponding portion 133 is fixed by the labial surface corresponding portion 131. The other end of the buccal surface corresponding portion 133 is a free end. The left end of the intermediation portion 137 and the right end of the intermediation portion 137 are shaped to be curved toward the handle 110. The left end of the intermediation portion 137 and the right end of the intermediation portion 137 facilitate an elastic motion of the buccal surface corresponding portion 133. The other end of the buccal surface corresponding portion 133 may freely vibrate or be bent. The buccal surface corresponding portion 133 may vibrate by means of kinetic energy of the washing water 51.

The spray holes 130a are formed in a direction toward the cervix between the crown and the gum. The spray holes 130a spray the washing water 51 at an angle of 30 degrees to 65 degrees. The spray holes 130a may be formed to spray the washing water 51 at an angle of 45 degrees. The spray holes 130a spray the washing water 51 to the cervix. The buccal surface corresponding portion 133 may vibrate to spray the washing water 51 to the periphery of the cervix. The washing water 51 is sprayed to the crowns and the gums at the periphery of the cervix. The washing water 51 massages the gums without damaging the gums, thereby improving the blood flow. The mouthpiece 130 washes portions between the crowns and the gums in the state in which the mouthpiece 130 is spaced apart from the cervices.

Figure 15:
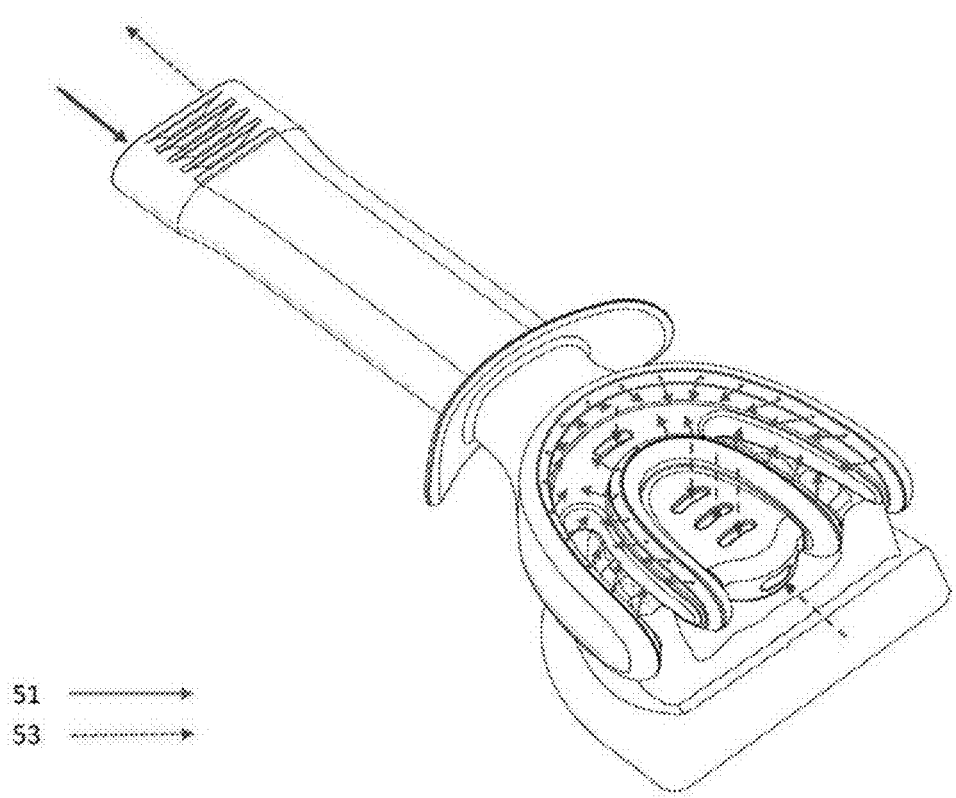
FIG. 15 is a view illustrating an example in which the oral cavity cleaner according to the embodiment of the present disclosure is bitten by a teeth model.

FIG. 15 is a view illustrating an example in which the oral cavity cleaner 100 according to the embodiment of the present disclosure is bitten by a teeth model.

Referring to FIGS. 15 and FIGS. 4 to 9, the oral cavity cleaner 100 according to the embodiment of the present disclosure includes: the handle 110 having the inflow path 101 through which the washing water 51 flows; and the mouthpiece 130 having spray holes 130a configured to spray the washing water 51 into the oral cavity. The mouthpiece 130 includes: the labial surface corresponding portion 131 formed at the position facing the labial surfaces of the teeth; the buccal surface corresponding portion 133 connected to the labial surface corresponding portion 131 and formed at the position facing the buccal surfaces of the teeth; the lingual surface corresponding portion 135 formed at the position facing the lingual surfaces of the teeth; and the intermediation portion 137 configured to connect the labial surface corresponding portion 131 and the lingual surface corresponding portion 135 and formed at the position at which the mouthpiece 130 is bitten by the seventh, eighth, ninth, and tenth teeth.

The intermediation portion 137 is formed at the position facing the occlusal surfaces of the front teeth. The intermediation portion 137 is formed at the position facing the occlusal surfaces of the user's front teeth and defines the front suction hole 139 for sucking the contaminated water 53 existing in the oral cavity. The intermediation portion 137 is bitten by the seventh, eighth, ninth, and tenth teeth or the sixth, seventh, eighth, ninth, tenth, and eleventh teeth. The washing water 51 flows between the front teeth. The diffusion flow path 103 is formed between the front teeth. The suction pipe 170 is disposed between the front teeth. The contaminated water 53 flows between the front teeth. The front suction hole 139 is connected to the suction pipe 170, and the front suction hole 139 is formed at the portion facing the front teeth. The front suction hole 139 facing the occlusal surfaces of the front teeth generates a high negative pressure. The front suction hole 139 increases a flow velocity at the periphery of the front teeth and increases washing power.

The oral cavity cleaner 100 according to the embodiment of the present disclosure the oral cavity cleaner 100 includes: the handle 110 having the inflow path 101 through which the washing water 51 flows; and the mouthpiece 130 having spray holes 130a configured to spray the washing water 51 into the oral cavity. The mouthpiece 130 includes: the labial surface corresponding portion 131 formed at the position facing the labial surfaces of the teeth; the buccal surface corresponding portion 133 connected to the labial surface corresponding portion 131 and formed at the position facing the buccal surfaces of the teeth; the lingual surface corresponding portion 135 formed at the position facing the lingual surfaces of the teeth; and the intermediation portion 137 formed at the position at which the mouthpiece is bitten by the user's anterior teeth and configured to connect the labial surface corresponding portion 131 and the lingual surface corresponding portion 135.

The intermediation portion 137 is formed to be spaced apart from the position at which the mouthpiece is bitten by the first, second, third, fourth, twelfth, thirteenth, fourteenth, fifteenth, and sixteenth teeth, and the buccal surface corresponding portion 133 defines a free end. The intermediation portion 137 is bitten by the seventh, eighth, ninth, and tenth teeth. The buccal surface corresponding portion 133 may elastically move in the direction toward the lingual surface corresponding portion 135.

The oral cavity cleaner 100 according to the embodiment of the present disclosure includes the core suction part 150 disposed on the user's tongue, connected to the labial surface corresponding portion 131, and configured to suck the contaminated water 53 in the oral cavity; and the suction pipe 170 disposed in the intermediation portion 137 and configured to define the concentration flow path 105 through which the contaminated water 53 sucked from the core suction part 150 flows.

The concentration flow path 105 is formed in the suction pipe 170. The contaminated water 53 introduced from the core suction part 150 and the contaminated water 53 introduced through the vertical channel 177 flow together in the concentration flow path 105. The suction pipe 170 includes the vertical channels 177 protruding in the longitudinal direction thereof and configured to define the flow interval 190 or 290 from the mouthpiece 130 in the longitudinal direction. The flow interval 190 or 290 defines the diffusion flow path 103 through which the washing water 51 flows between the suction pipe 170 and the mouthpiece 130.

Figure 16:
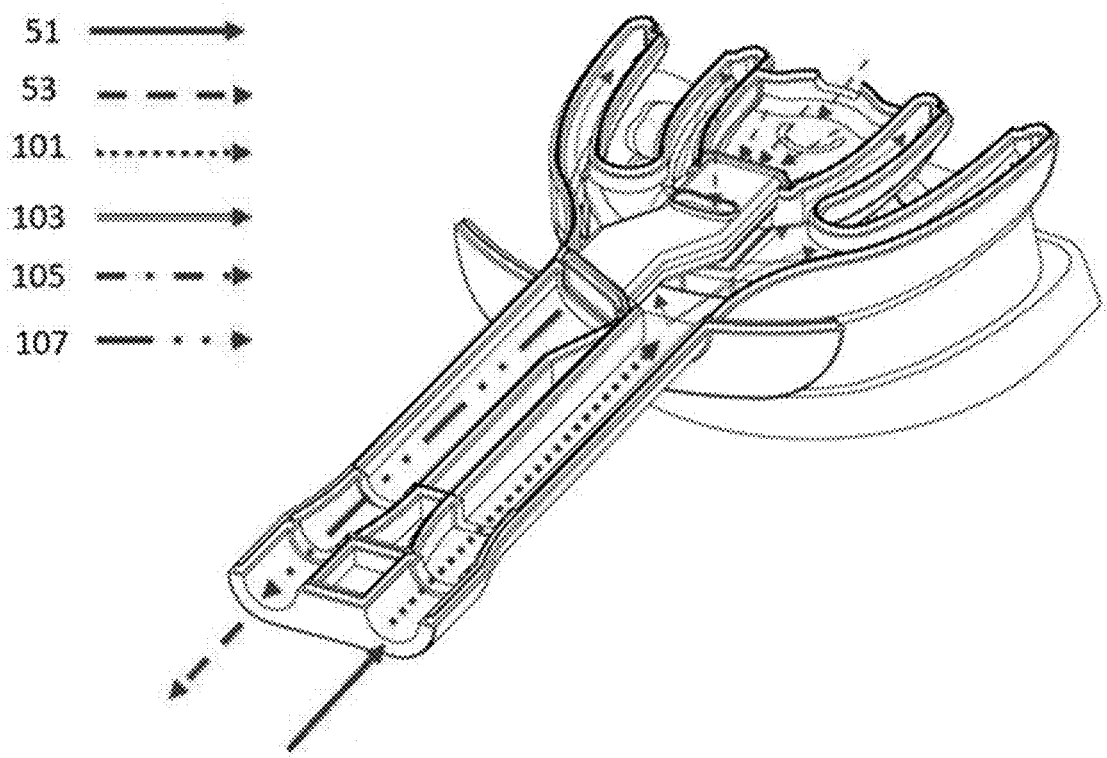
FIG. 16 is a view illustrating a flow of washing water and a flow of contaminated water when the oral cavity cleaner illustrated in FIG. 15 is used.

FIG. 16 is a view illustrating a flow of washing water and a flow of contaminated water when the oral cavity cleaner illustrated in FIG. 15 is used.

Referring to FIGS. 16 and FIGS. 12 to 15, the oral cavity cleaner according to the embodiment of the present disclosure includes: the mouthpiece 130 configured to spray the washing water 51 into the oral cavity; the core suction part 150 configured to suck the contaminated water 53, in which the washing water 51 and the saliva are mixed, from the inside of the oral cavity; and the handle 110 having the inflow path 101 through which the washing water 51 flows and the discharge flow path 107 through which the contaminated water 53 discharged from the core suction part 150 flows. The handle 110 includes a mouth guard 119 formed on an outer peripheral surface of the handle and having an end curved rearward.

The mouth guard 119 is curved in a bow shape. One transverse side of the mouth guard 119 comes into close contact with the adductor pollicis muscle of the thumb, and the other transverse side of the mouth guard 119 comes into close contact with the proximal phalanx of the thumb. The mouth guard 119 has an elliptical shape in which transverse ends thereof are curved rearward. The contaminated water 53, which is not sucked by the core suction part 150, may be discharged to the outside of the mouth. The mouth guard 119 is disposed between the user's mouth and hand and prevents the contaminated water 53 from scattering. The mouth guard 119 prevents the contact between the mouth and the hand. When the user holds the handle 110, the mouth guard 119 increases a contact area with a lateral surface of the fist. The mouth guard 119 enables the user to stably hold the handle 110.

The handle 110 includes the mouth guard 119 formed on the outer peripheral surface of the handle 110 and having the transverse end curved rearward. The handle 110 includes the elliptical mouth guard 119 protruding along the outer peripheral surface of the handle 110. The mouth guard 119 is formed on the outer peripheral surface of the handle 110. The mouth guard 119 is curved in the direction toward the mouthpiece 130 and increases the close contact range with the hand when the user grasps the handle 110. The mouth guard 119 enables the user to stably grasp the handle 110 with the hand. The mouth guard 119 prevents the contact between the hand and the lip. The mouth guard 119 prevents the washing water 51 discharged from the mouth from being discharged forward. The handle 110 may have the mouth guard 119, such that the user may recognize the position at which the user easily holds the handle 110. The mouth guard 119 comes into close contact with the lateral surface of the user's fist.

The mouth guard 119 is gently curved toward the user's lip. This shape prevents the user's mouth from coming into contact with the hand. The mouth guard 119 prevents bacteria from entering the mouth through the hand. The mouth guard 119 is disposed in front of the mouth and prevents the contaminated water 53, which is not sucked and discharged into the mouth, from scattering.

The washing water 51 discharged from the main body is introduced into the handle 110. The washing water 51 is introduced into the upstream side 101a of the inflow path 101. The washing water 51 flows toward the downstream side 101b of the inflow path 101. Since the inflow path 101 is formed at one side (the left side in the drawing) of the handle 110, the washing water 51 is discharged toward one side (the left in the drawing) of the mouthpiece 130. The diffusion flow path 103 is formed at the downstream side 101b of the inflow path 101.

The washing water 51 is introduced into the diffusion flow path 103 and then distributed to all the flow paths of the mouthpiece 130. A part of the washing water 51 flows toward the left side of the mouthpiece 130. Another part of the washing water 51 flows toward the right side of the mouthpiece 130. The suction pipe 170 is disposed in the diffusion flow path 103. The flow interval 190 or 290 is formed between the suction pipe 170 and the mouthpiece 130. The washing water 51 flows to the right side of the mouthpiece 130 through the flow interval 190 or 290.

The flow path guide 179 may be disposed in the handle 110 or the suction pipe 170. The flow path guide 179 divides the washing water 51 into the two directions. Therefore, the washing water 51 introduced from the left side of the handle 110 may flow to a right end of the mouthpiece 130. The above-mentioned structure reduces the flow resistance while simultaneously perform the suction and discharge, thereby uniformly and smoothly diffusing the washing water 51.

The washing water 51 flows to the labial surface corresponding portion 131, the lingual surface corresponding portion 135, and the buccal surface corresponding portion 133. The washing water 51 is sprayed into the oral cavity through the spray holes 130a. The washing water 51 is sprayed toward the cervix. Like the cantilevered beam, one side of the buccal surface corresponding portion 133 is connected to the labial surface corresponding portion 131, and the other side of the buccal surface corresponding portion 133 is formed as a free end. The lateral end 137b of the intermediation portion 137 is curved in a 'C' shape so that the buccal surface corresponding portion 133 may elastically move in the direction toward the labial surface corresponding portion 131. The kinetic energy of the washing water 51 vibrates the buccal surface corresponding portion 133. Therefore, the buccal surface corresponding portion 133 elastically moves. The vibration of the buccal surface corresponding portion 133 finely changes a spray direction. That is, an object to which the washing water 51 is sprayed is finely changed.

The washing water 51 may stimulate all the cervix, the crown, the gum, and the like. The change in spray direction of the washing water 51 may not only remove foreign substances trapped between the teeth, but also massage the gums. The massage on the gums strengthens the gum tissue, improves the blood circulation, and increase the immunity of the gums. The massage on the gums using the washing water 51 does not injure the gums.

The washing water 51 sprayed into the oral cavity is mixed with the saliva and foreign substances and becomes the contaminated water 53. The oral cavity cleaner 100 needs to quickly suck the contaminated water 53. When an excessive amount of contaminated water 53 exists in the oral cavity, the contaminated water 53 hinders the operation of spraying the washing water 51. In addition, when an excessive amount of contaminated water 53 is present, the contaminated water 53 may flow to the respiratory tract or the esophagus. Therefore, it is necessary to quickly remove the contaminated water 53.

According to the oral cavity cleaner 100 according to the present disclosure, the core suction part 150 and the front suction hole 139 suck the contaminated water 53. When the user slightly lowers his/her head, the contaminated water 53 may be collected in the vicinity of the anterior teeth. The front suction hole 139 sucks the contaminated water 53 existing in the vicinity of the anterior teeth. The front suction hole 139 may be formed at both the upper and lower sides of the intermediation portion 137. However, when the front suction hole 139 is formed at the lower side of the intermediation portion 137, there is concern that the contaminated water 53 sucked by the core suction part 150 may be discharged. Therefore, the front suction hole 139 may be formed at the upper side of the intermediation portion 137. Because of the shape of the intermediation portion 137, a vacant space is formed between the buccal surface corresponding portion 133 and the lingual surface corresponding portion 135. The vacant space enables the contaminated water 53 to be easily collected downward. The contaminated water 53 collected downward flows to the lower suction hole 159 through the suction guide portion 153. The suction guide portion 153 includes the first suction guide portion 153a and the second suction guide portion 153b. The first suction guide portion 153a is higher in height (protruding degree) than the lingual surface corresponding portion 135. The tongue comes into contact with the first suction guide portion 153a, but the tongue does not come into direct contact with the lingual surface corresponding portion 135. The contaminated water 53 may flow through a gap between the tongue and the lingual surface corresponding portion 135, and the contaminated water 53 may flow to the first suction guide portion 153a. Since the suction guide portion 153 has the trough 151, the suction guide portion 153 is not blocked by the tongue. The second suction guide portion 153b is lower in height than the first suction guide portion 153a. The tongue does not block the second suction guide portion 153b. The first suction guide portion 153a formed at the front side prevents the contact between the tongue and the lingual surface corresponding portion 135 and the contact between the tongue and the second suction guide portion 153b. The suction guide portion 153 is formed in a 'U' shape. This shape increases the contact area with the contaminated water 53 moving along the median sulcus of the tongue formed at the center of the tongue.

The upper suction hole 155 is disposed in the direction toward the palate and sucks the contaminated water 53. Because the contaminated water 53 continuously scatters in the oral cavity, the contaminated water 53 is also present at the upper side.

The core suction part 150 is lower in height than the lingual surface corresponding portion 135. In addition, the core suction part 150 is surrounded by the lingual surface corresponding portion 135. The lingual surface corresponding portion 135 serves as a wall that traps the contaminated water 53. That is, the contaminated water 53 is trapped in the lingual surface corresponding portion 135, and the upper suction hole 155 sucks the contaminated water 53.

The edge of the core suction part 150 is surrounded by the mouthpiece 130. Therefore, the core suction part 150 comes into direct contact with the oral mucosa and prevents the weak oral mucosa from being injured. The rear suction hole 157 sucks the contaminated water 53 existing in the vicinity of the uvula or the contaminated water 53 which is intended to flow to the respiratory tract or the esophagus through the uvula. The contaminated water 53 sucked by the core suction part 150 flows to the suction pipe 170. The contaminated water 53 introduced through the front suction hole 139 flows to the suction pipe 170.

The concentration flow path 105 is formed in the suction pipe 170. The concentration flow path 105 is connected to the discharge flow path 107. The suction pipe 170 has the vertical channel 177, and the mouthpiece 130 has the vertical protrusion 137a. The vertical channel 177 and the vertical protrusion 137a are coupled to each other to define the flow interval 190 or 290. The flow interval 190 or 290 is a gap that defines the diffusion flow path 103. Even though the suction pipe 170 is disposed at the center, the flow interval 190 or 290 may minimize the interruption to the flow of the washing water 51 and form the diffusion flow path 103.

The discharge flow path 107 is formed at one side (the right side in the drawing) of the handle 110, and the core suction part 150 is disposed at the central portion. The suction pipe 170 requires a curved section. The bending channel 175 defines a curved portion of the concentration flow path 105. The bending channel 175 is disposed in a curved portion of the suction pipe 170. The curved portion tilts the contaminated water 53 toward one side. The curved portion on the flow path may define a vacuum portion. The curved portion on the flow path and the vacuum portion increase water hammering and flow resistance. The upstream side 107a of the discharge flow path 107 has a portion in which the discharge flow path 107 is temporarily widened. The inflow partition wall 111 and the discharge partition wall 117 are disposed to be spaced apart from each other, but the connection partition wall 113 inclinedly disposed connects the inflow partition wall 111 and the discharge partition wall 117. The connection partition wall 113 temporarily increases the width of the discharge flow path 107. The upstream side 107a of the discharge flow path 107 is the space for mitigating the water hammering caused by the contaminated water 53 discharged from the suction pipe 170. The upstream side 107a of the discharge flow path 107 is the space for reducing the flow resistance of the contaminated water 53. The contaminated water 53 is discharged to the outside through the downstream side 107b of the discharge flow path 107. The contaminated water 53 may be stored in the main body.

Figure 17:
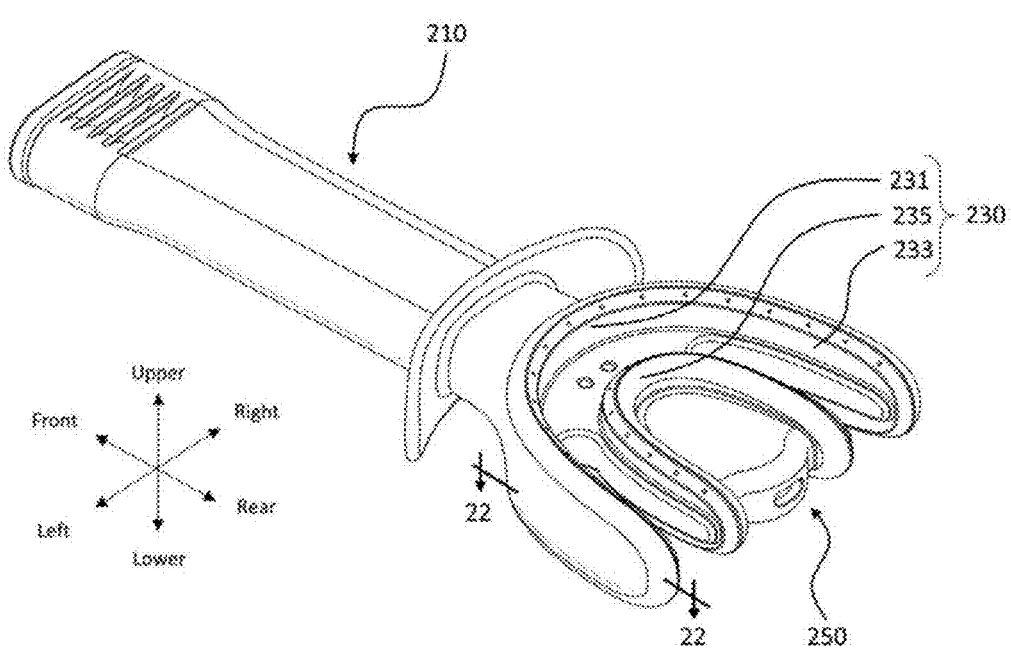
FIG. 17 is a perspective view of an oral cavity cleaner according to another embodiment of the present disclosure.
Figure 18:
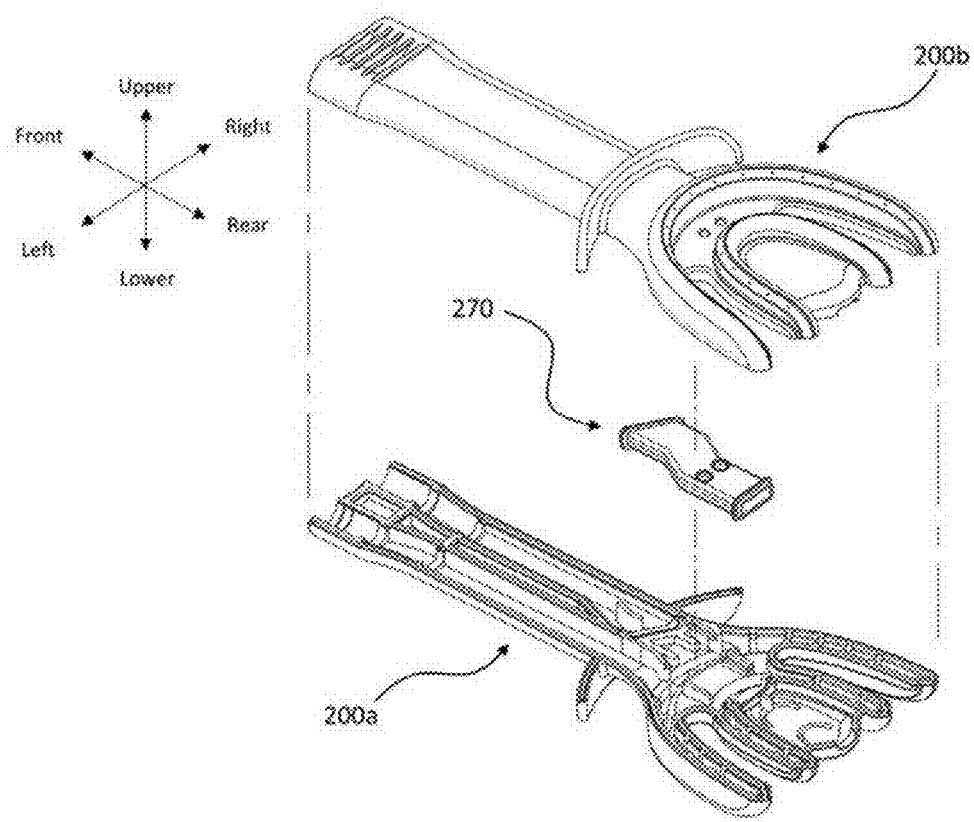
FIG. 18 is an exploded perspective view of the oral cavity cleaner according to another embodiment of the present disclosure.

FIG. 17 is a perspective view of an oral cavity cleaner according to another embodiment of the present disclosure. FIG. 18 is an exploded perspective view of the oral cavity cleaner according to another embodiment of the present disclosure. FIG. 19 is a perspective view of a lower portion 200a of the oral cavity cleaner according to another embodiment of the present disclosure.

Referring to FIGS. 17 to 19, an oral cavity cleaner 200 according to the embodiment of the present disclosure includes: a handle 210 having an inflow path 201 through which washing water 51 flows; and a mouthpiece 230 connected to the inflow path 201 and having a plurality of spray holes 230a for spraying the washing water 51 into an oral cavity.

The oral cavity cleaner 200 may include an upper portion 200b and a lower portion 200a. A suction pipe 270 is disposed between the upper portion 200b and the lower portion 200a.

The washing water 51 is introduced into an upstream side 201a of the inflow path 201, passes through a downstream side 201b of the inflow path 201 and a diffusion flow path 203, and flows to the mouthpiece 230. The washing water 51 flows through upper and lower sides of the suction pipe 270.

A core suction part 250 is disposed at a center of the mouthpiece 230. The contaminated water 53 introduced through the core suction part 250 is discharged to the handle 210 through the suction pipe 270. The contaminated water 53 flows from an upstream side 207a of a discharge flow path 207 to a downstream side 207b of the discharge flow path 207. The contaminated water 53 is discharged to the main body or to the outside and discarded.

Figure 20:
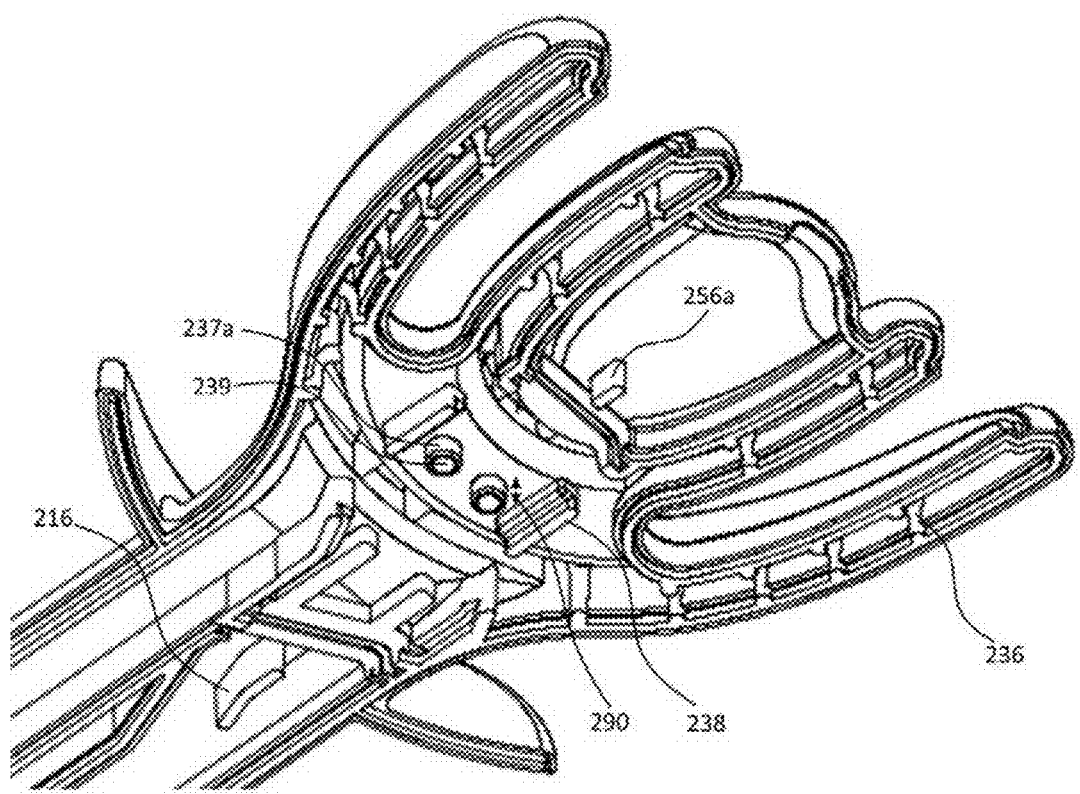
FIG. 20 is a perspective view of an upper portion of the oral cavity cleaner according to another embodiment of the present disclosure.
Figure 21:
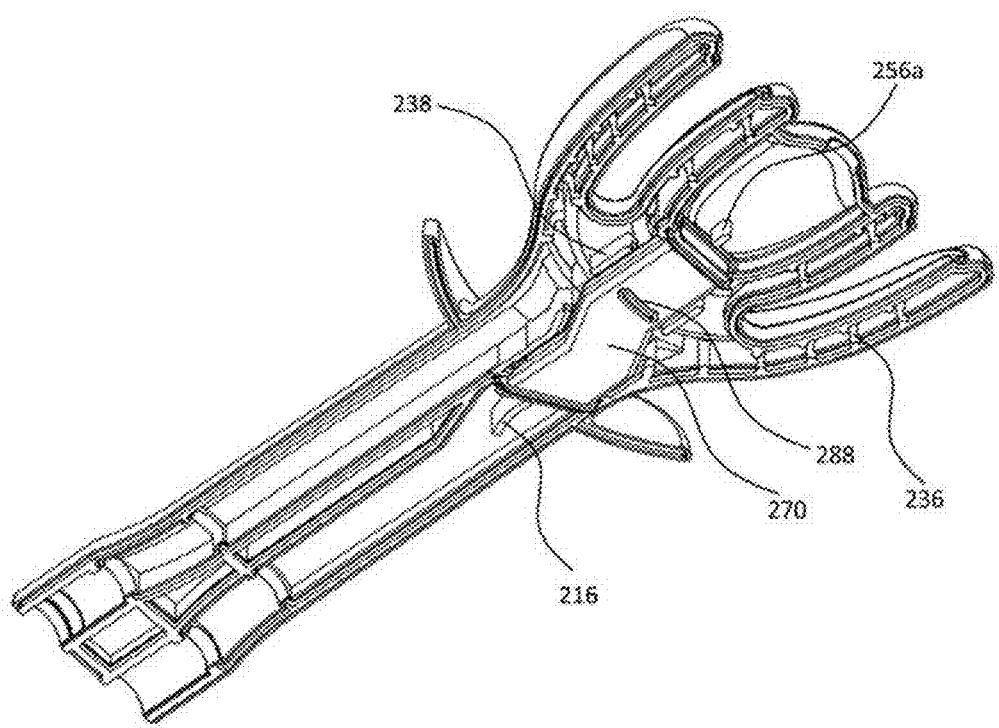
FIG. 21 is a perspective view illustrating a state in which the suction pipe is coupled to the upper portion of the oral cavity cleaner according to another embodiment of the present disclosure.
Figure 22:
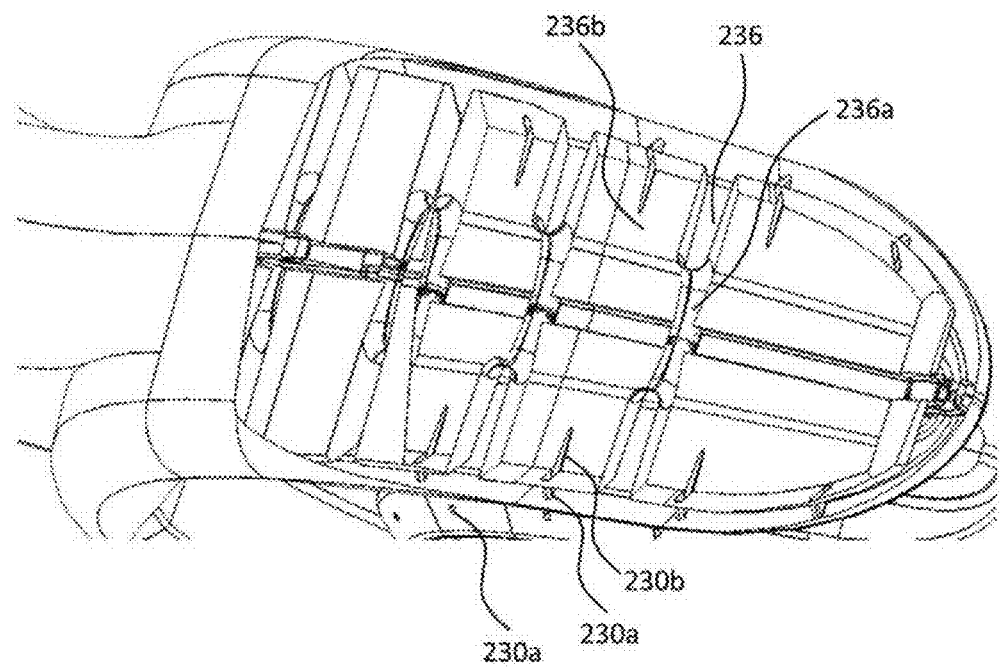
FIG. 22 is a cross-sectional view taken along line 22-22 in FIG. 17.
Figure 23:
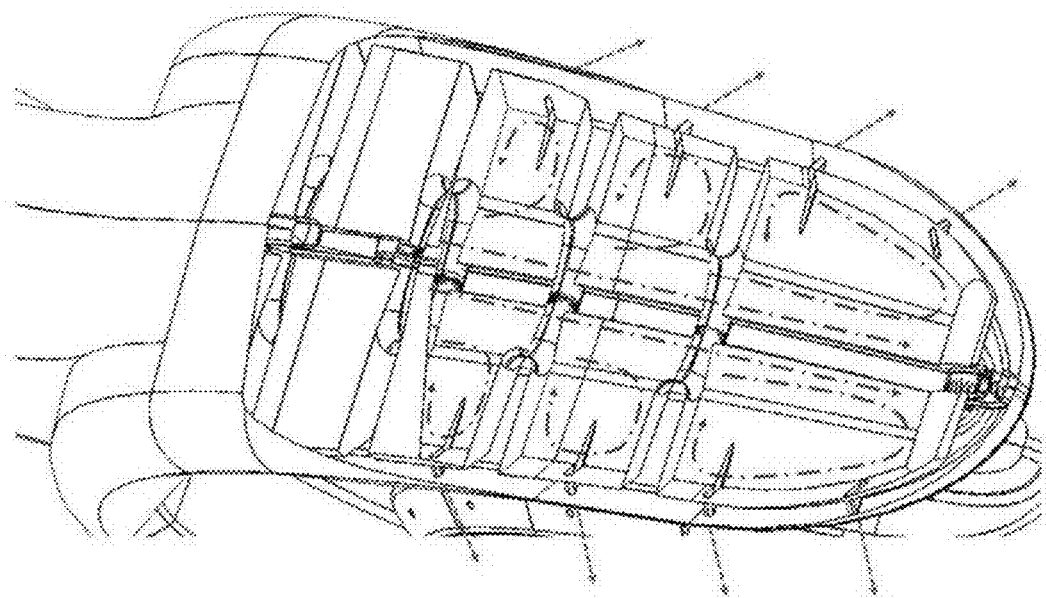
FIG. 23 is a view illustrating a flow of washing water illustrated in FIG. 22.

FIG. 20 is a perspective view of an upper portion 200b of the oral cavity cleaner according to another embodiment of the present disclosure. FIG. 21 is a perspective view illustrating a state in which the suction pipe 270 is coupled to the upper portion 200b of the oral cavity cleaner according to another embodiment of the present disclosure. FIG. 22 is a cross-sectional view taken along line 22-22 in FIG. 17. FIG. 23 is a view illustrating a flow of the washing water 51 water illustrated in FIG. 22.

Referring to FIGS. 20 to 23, the oral cavity cleaner 200 according to the embodiment of the present disclosure includes: the handle 210 having the inflow path 201 through which washing water 51 flows; and the mouthpiece 230 connected to the inflow path 201 and having the plurality of spray holes 230a for spraying the washing water 51 into the oral cavity. Water stoppers 236 are formed between the plurality of spray holes 230a in the mouthpiece 230.

The washing water 51 flows to the mouthpiece 230. A part of the washing water 51 flows reversely by the water stoppers 236. The water stopper is provided in plural. A part of the washing water 51, which flows reversely, is discharged to the outside through the spray holes 230a, and another part of the washing water 51 is trapped and circulated between the water stoppers 236. The water stopper 236 is provided in plural. Spray grooves 230b by which the washing water 51 flows in the direction toward the spray holes 230a are formed between the plurality of water stoppers 236.

The water stopper 236 is provided in plural. The spray grooves 230b by which the washing water 51 flows in the direction toward the spray holes 230a are formed between the plurality of water stoppers 236. The spray grooves 230b are formed between the water stoppers 236. The spray grooves 230b are separately formed for the respective spray holes 230a. The washing water 51 trapped between the water stoppers 236 flows to the spray holes 230a through the spray grooves 230b. The water stopper 236 is provided in plural. Reservoirs 236b for storing the flowing washing water 51 are formed between the plurality of water stoppers 236. The water stoppers 236 are disposed in the flow direction of the washing water 51 and define the reservoirs 236b for guiding the washing water 51 so that a part of the washing water 51 flows reversely.

The plurality of reservoirs 236b may have volumes that gradually increase rearward. The reservoir 236b stores the washing water 51. A part of the washing water 51 flowing to the reservoir 236b is discharged to the spray hole 230a, another part of the washing water 51 circulates in the reservoir 236b, and still another part of the washing water 51 is discharged to the outside and flows to another reservoir 236b. The water stopper 236 is elongated in the upward/downward direction, and the center of the water stopper 236 has a flow hole 236a through which the washing water 51 flows. The water stopper 236 is disposed to be perpendicular to the flow direction of the washing water 51.

The oral cavity cleaner 200 according to the embodiment of the present disclosure includes: the handle 210 having the inflow path 201 through which the washing water 51 flows; and the mouthpiece 230 having the reservoirs 236b connected to the inflow path 201 and configured to store the washing water 51, and the spray holes 230a disposed in the reservoirs 236b and configured to spray the washing water 51 into the oral cavity.

The spray groove 230b is formed in the reservoir 236b and guides the washing water 51 in the direction toward the spray hole 230a. The reservoir 236b is provided in plural, and the water stopper 236 is formed between the reservoirs 236b. At least one spray grooves 230b and at least one spray holes 230a are formed in the reservoir 236b. The water stopper 236 has the flow hole 236a through which the washing water 51, which exceeds a storage capacity of the reservoir 236b, flows to another reservoir 236b. The plurality of water stoppers 236, the plurality of reservoirs 236b, and the plurality of flow holes 236a are formed in the mouthpiece 230. The washing water 51, exceeding the capacity of the reservoir 236b, flows to another reservoir 236b through the flow hole 236a.

The oral cavity cleaner 200 according to the embodiment of the present disclosure includes: the handle 210 having the inflow path 201 through which the washing water 51 flows; and the mouthpiece 230 having the plurality of water stoppers 236 disposed in the flow direction of the washing water 51 applied from the inflow path 201 and configured to define the plurality of reservoirs 236b therein, and the one or more spray holes 230a disposed in the reservoirs 236b and configured to spray the washing water 51 into the oral cavity.

The plurality of reservoirs 236b is formed in the flow direction of the washing water 51. The plurality of water stoppers 236 is formed in the flow direction of the washing water 51. The water stoppers 236 is formed vertically to circulate the introduced washing water 51 in the upward/downward direction.

Figure 24:
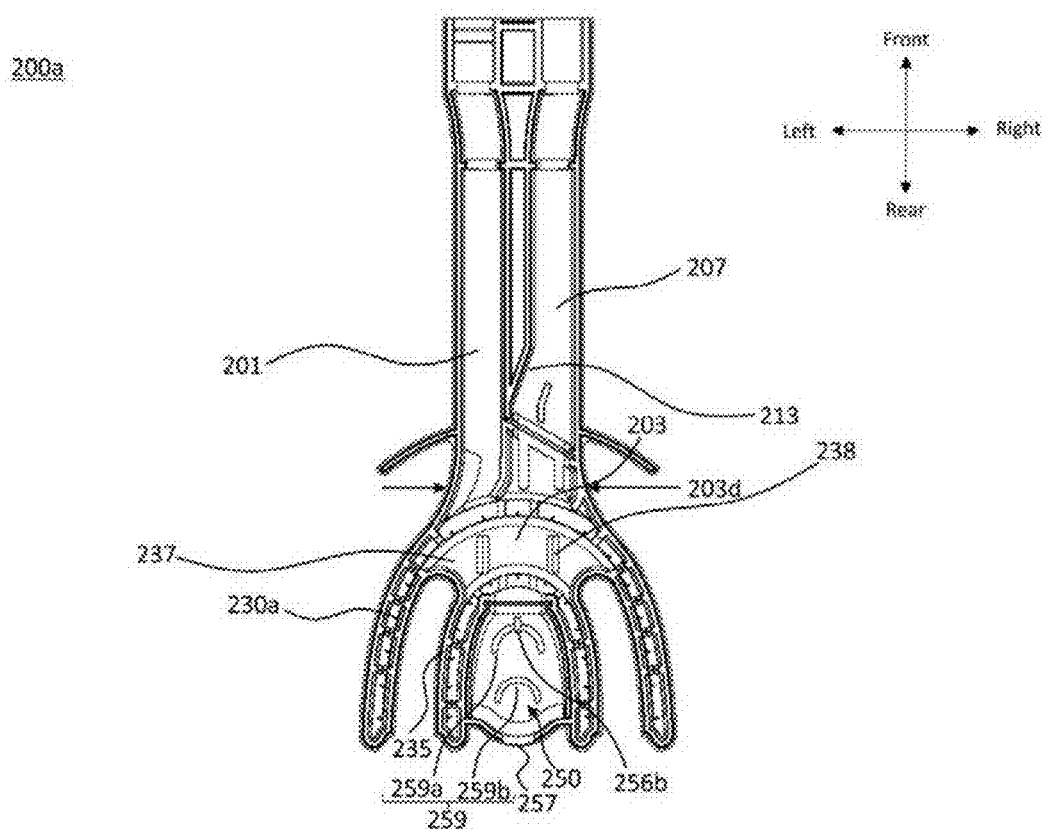
FIG. 24 is a top plan view of the lower portion of the oral cavity cleaner according to another embodiment of the present disclosure.
Figure 25:
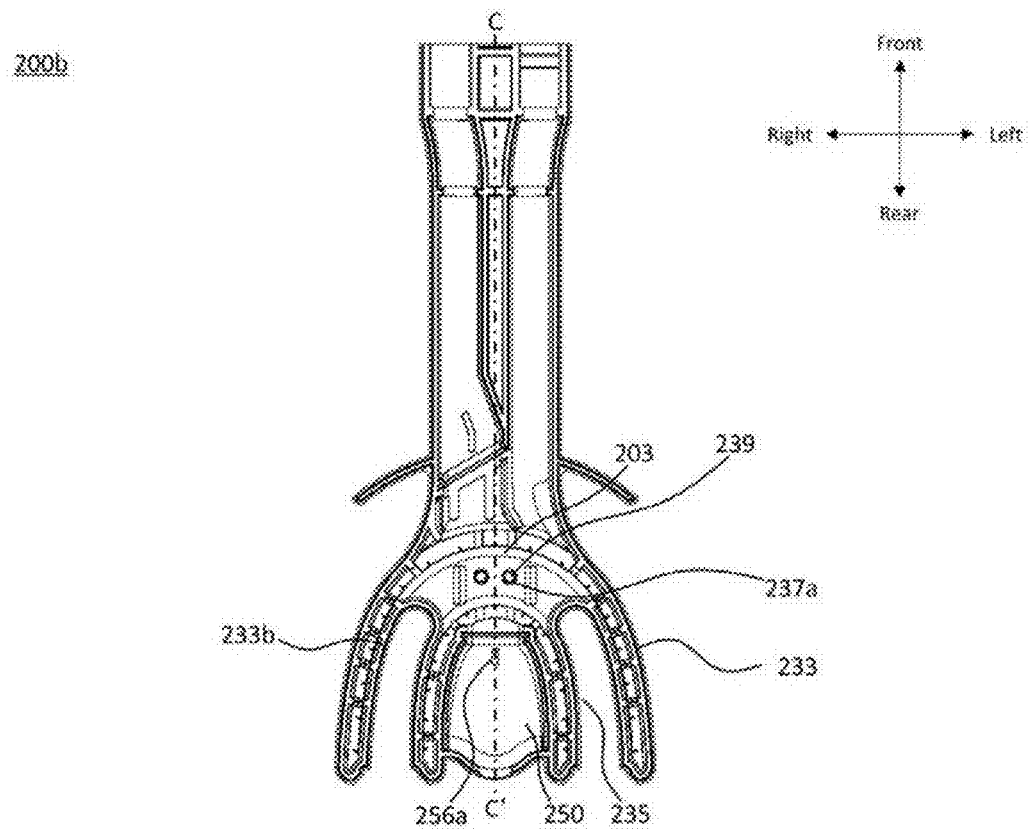
FIG. 25 is a top plan view of the upper portion of the oral cavity cleaner according to another embodiment of the present disclosure.
Figure 26:
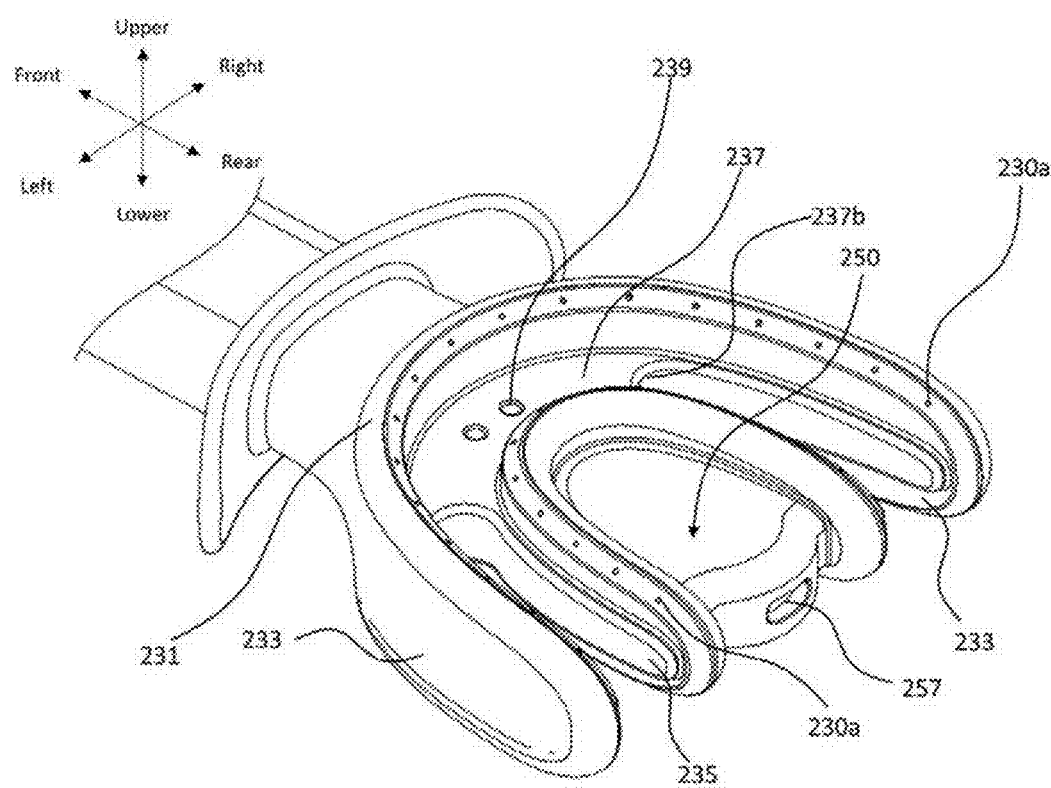
FIG. 26 is an enlarged view of a mouthpiece illustrated in FIG. 17.
Figure 27:
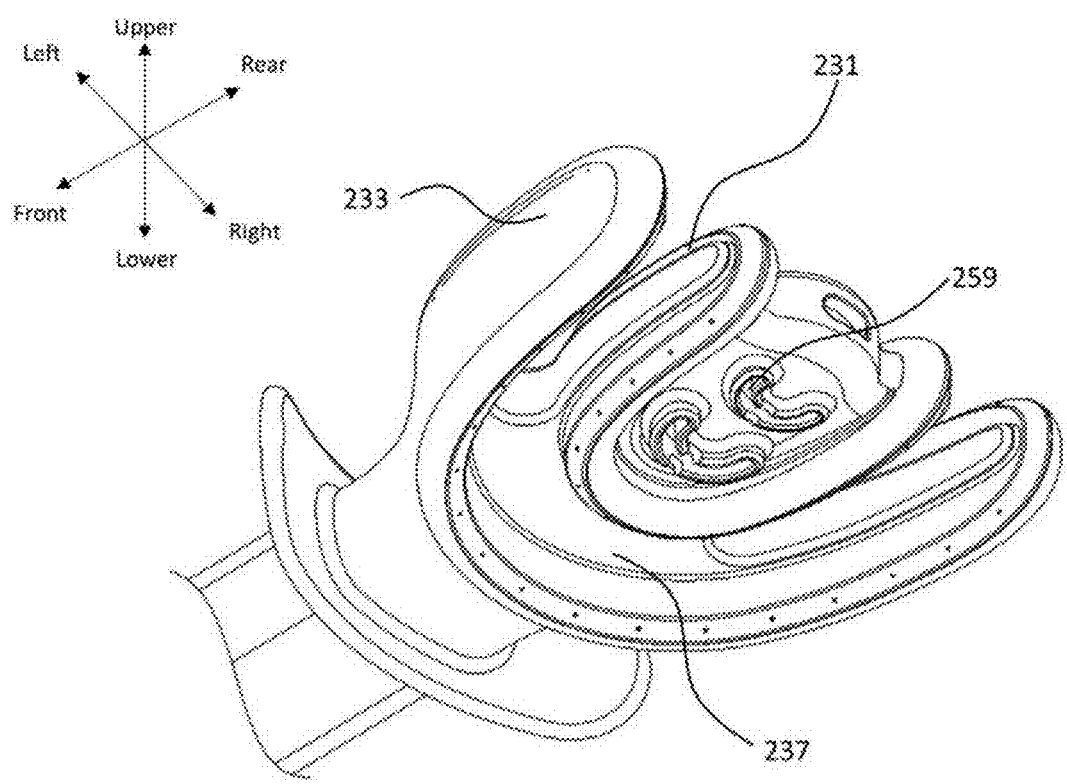
FIG. 27 is a view illustrating the mouthpiece illustrated in FIG. 26 when viewed from below.

FIG. 24 is a top plan view of the lower portion 200a of the oral cavity cleaner according to another embodiment of the present disclosure. FIG. 25 is a top plan view of the upper portion 200b of the oral cavity cleaner according to another embodiment of the present disclosure. FIG. 26 is an enlarged view of the mouthpiece 230 illustrated in FIG. 17. FIG. 27 is a view illustrating the mouthpiece 230 in FIG. 26 when viewed from below.

Referring to FIGS. 24 to 27, the oral cavity cleaner 200 according to the embodiment of the present disclosure may include: the handle 210 having the inflow path 201 through which the washing water 51 flows and the discharge flow path 207 through which the contaminated water 53 sucked from the oral cavity flows; the mouthpiece 230 connected to the inflow path 201 and configured to spray the washing water 51 into the oral cavity; the core suction part 250 configured to suck the contaminated water 53 that has been discharged from the mouthpiece 230 and washed the teeth; and the suction pipe 270 configured to connect the core suction part 250 and the handle 210. Water splitters 256a and 256b are formed in the core suction part 250 and disposed at the front side of the suction pipe 270. The water splitters 256a and 256b divide the sucked contaminated water 53.

The core suction part 250 has a rear suction hole 257 formed at the position facing the uvula, and the water splitters 256a and 256b are disposed between the rear suction hole 257 and the suction pipe 270.

The mouthpiece 230 has front suction holes 239 formed at the portion facing the occlusal surfaces of the front teeth among the upper teeth. The washing water 51 is sprayed into the mouthpiece 230 and the oral cavity. The core suction part 250 sucks the contaminated water 53 in the oral cavity. The washing water 51 sprayed by the mouthpiece 230 is mixed with contaminants and saliva in the oral cavity and becomes the contaminated water 53. The contaminated water 53 is sucked through the core suction part 250. The contaminated water 53 is sucked through the front suction hole 239 disposed in an intermediation portion 237.

The oral cavity cleaner 200 according to the embodiment of the present disclosure may include: the handle 210 having the inflow path 201 through which the washing water 51 flows and the discharge flow path 207 through which the contaminated water 53 sucked from the oral cavity flows; the mouthpiece 230 connected to the inflow path 201 and configured to spray the washing water 51 into the oral cavity; the core suction part 250 configured to suck the contaminated water 53 that has been discharged from the mouthpiece 230 and washed the teeth; and the suction pipe 270 configured to connect the core suction part 250 and the handle 210. Dampers 238 are formed in the mouthpiece 230 and disposed in the transverse direction of the suction pipe 270. The dampers 238 prevent a collision with the washing water 51.

The mouthpiece 230 includes: a labial surface corresponding portion 231 formed at a position facing the labial surfaces of the teeth; a buccal surface corresponding portion 233 connected to the labial surface corresponding portion 231 and formed at position facing the buccal surfaces of the teeth; a lingual surface corresponding portion 235 formed at a position facing the lingual surfaces of the teeth; and the intermediation portion 237 configured to connect the labial surface corresponding portion 231 and the lingual surface corresponding portion 235 and having two opposite ends starting from the connection point between the labial surface corresponding portion 231 and the lingual surface corresponding portion 235. The damper 238 is disposed in the intermediation portion 237.

The washing water 51 introduced through the inflow path 201 flows to the diffusion flow path 203. The suction pipe 270 is disposed in the intermediation portion 237. The suction pipe 270 is disposed in the diffusion flow path 203. The washing water 51 collides with the suction pipe 270 disposed in the diffusion flow path 203. The damper prevents the washing water 51 from colliding directly with the suction pipe 270. The damper prevents the washing water 51 from colliding directly with a lateral surface of the suction pipe 270. The damper inhibits the suction pipe 270 from vibrating in the mouthpiece 230.

The mouthpiece 230 has the front suction hole 239 formed at the portion facing the occlusal surfaces of the upper teeth, and a vertical protrusion 237a is formed at the edge of the front suction hole 239. The vertical protrusion 237a protrudes inward and define an interval from the suction pipe 270. The diffusion flow path 203 is formed between the upper surfaces and the lower surfaces of the mouthpiece 230 and the suction pipe 270. The vertical protrusion 237a defines the interval between the mouthpiece 230 and the suction pipe 270.

Figure 28:
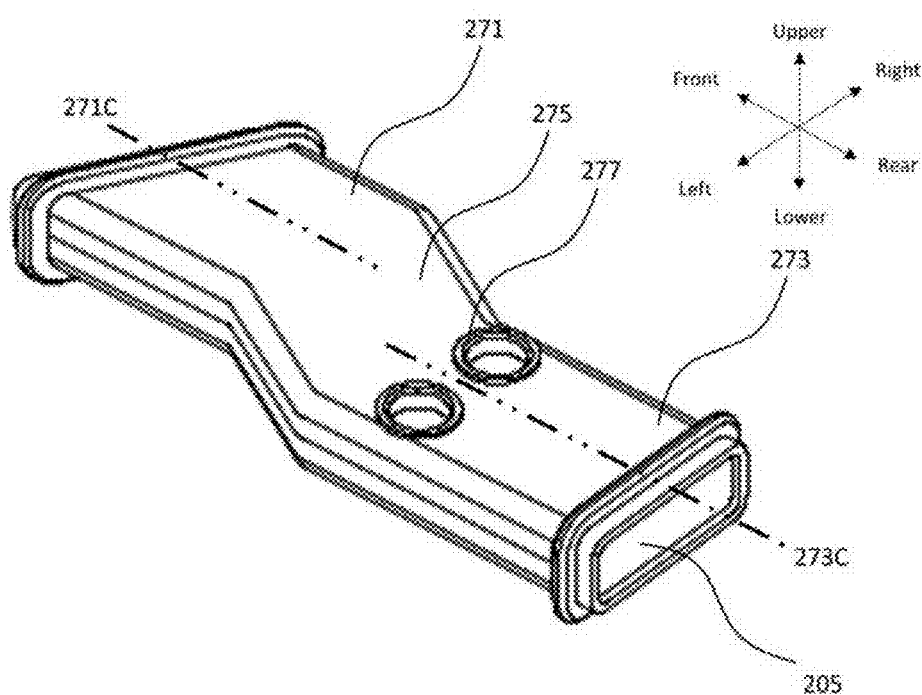
FIG. 28 is a perspective view of a suction pipe according to another embodiment of the present disclosure.
Figure 29:
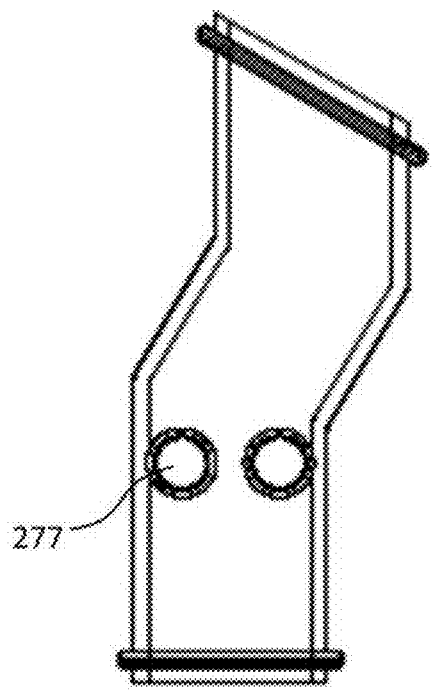
FIG. 29 is a top plan view of the suction pipe illustrated in FIG. 28.
Figure 30:
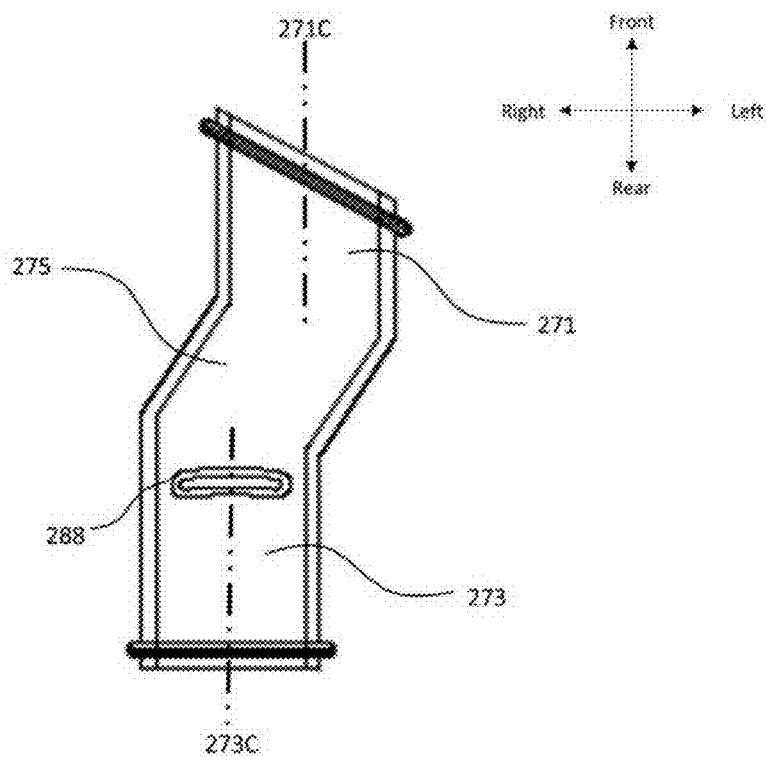
FIG. 30 is a bottom plan view of the suction pipe illustrated in FIG. 28.

FIG. 28 is a perspective view of the suction pipe 270 according to another embodiment of the present disclosure. FIG. 29 is a top plan view of the suction pipe 270 illustrated in FIG. 28. FIG. 30 is a bottom plan view of the suction pipe 270 illustrated in FIG. 28.

Referring to FIGS. 28 to 30, the suction pipe 270 includes: a front channel 271 connected to the discharge flow path 207 of the handle 210; a rear channel 273 connected to the core suction part 250; and a bending channel 275 disposed to be inclined with respect to a centerline 273C of the rear channel and a centerline 271C of the front channel and configured to connect the rear channel 273 and the front channel 271.

The suction pipe 270 has a vertical channel formed at an upper side of the rear channel 273 and configured to communicate with the front suction hole 239. The suction pipe 270 has a vertical bar 288 formed at a lower side of the rear channel 273 and configured to define a flow interval 190 or 290 through which the washing water 51 flows between the mouthpiece 230 and the suction pipe 270.

Figure 31:
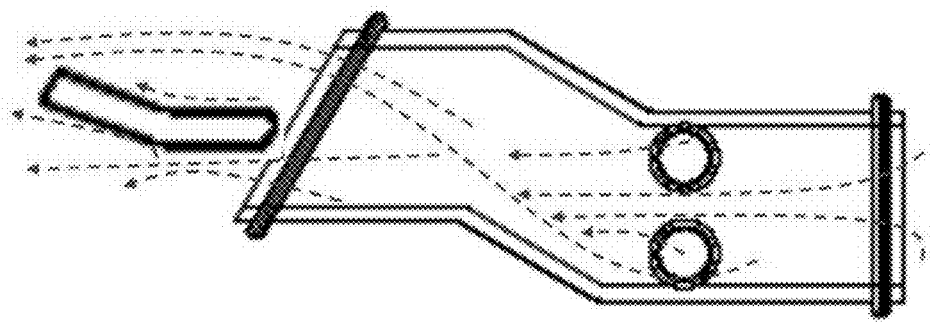
FIG. 31 is a view illustrating a flow of contaminated water made by the suction pipe and a water diffuser.
Figure 32:
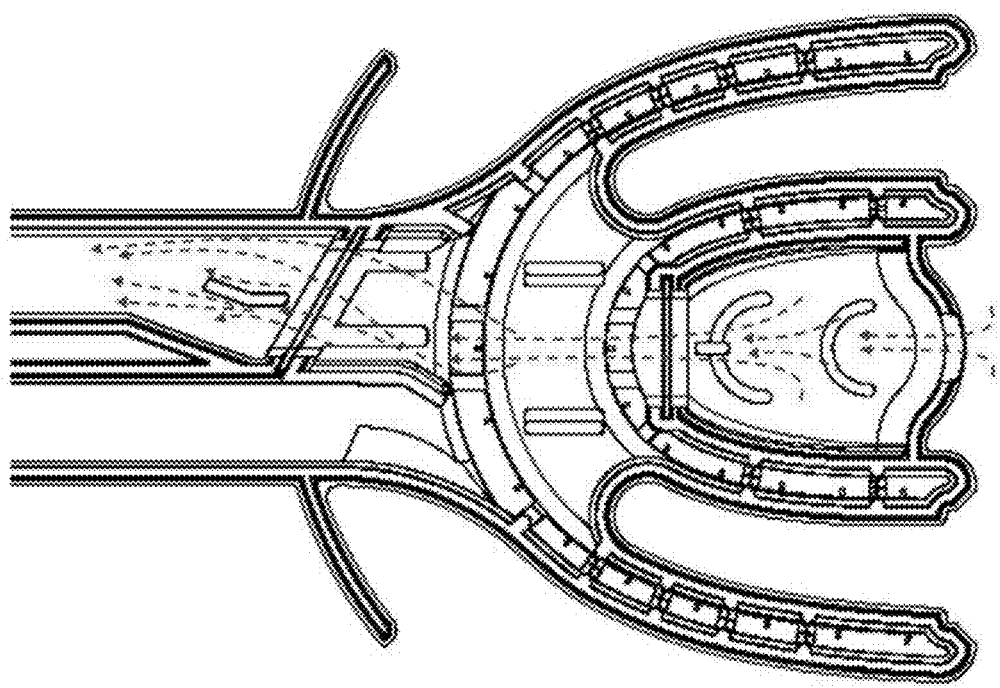
FIG. 32 is a view illustrating a flow of contaminated water at a part of FIG. 24.
Figure 33:
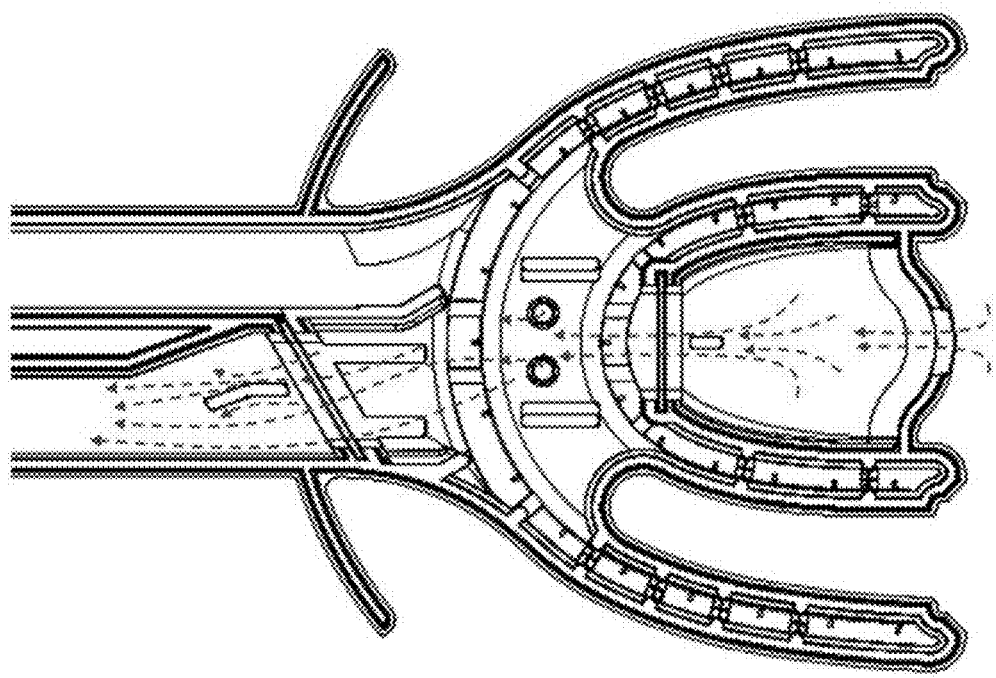
FIG. 33 is a view illustrating a flow of contaminated water at a part of FIG. 25.

FIG. 31 is a view illustrating a flow of the contaminated water 53 made by the suction pipe 270 and the water diffuser 216. FIG. 32 is a view illustrating a flow of the contaminated water 53 indicated on a part of FIG. 24. FIG. 33 is a view illustrating a flow of the contaminated water 53 indicated on a part of FIG. 25.

Referring to FIGS. 31 to 33, the contaminated water 53 is sucked from the plurality of positions such as the lower suction hole 259 and the rear suction hole 257 and flows to the core suction part 250. The water splitters 256a and 256b are disposed in the core suction part 250. The water splitters 256a and 256b divide the contaminated water 53 introduced through the rear suction hole 257. The water splitters 256a and 256b divide the washing water 51 flowing to the suction pipe 270. The water splitters 256a and 256b increase a flow velocity of the contaminated water 53 flowing along the suction pipe 270. The water splitters 256a and 256b make an internal pressure in the suction pipe 270 lower than an internal pressure in the core suction part 250. The core suction part 250 has lower suction holes 259 formed at positions facing the tongue, and the water splitters 256a and 256b are disposed at the positions at which the lower suction holes 259 are separated.

The water splitters 256a and 256b may be separated vertically. The upper splitters 256a and 256ba are formed on the upper portion 200b, and the lower splitters 256a and 256bb are formed on the lower portion 200a. The water splitters 256a and 256b divide the contaminated water 53 introduced through the lower suction hole 259. The water splitters 256a and 256b align the flow directions of the contaminated water 53 and increase the flow velocity of the contaminated water 53. The water splitters 256a and 256b are made by coupling the upper splitters 256a and 256ba and the lower splitters 256a and 256bb which are separately formed, and the lower splitters 256a and 256bb are disposed in the lower suction hole 259.

The oral cavity cleaner 200 according to the embodiment of the present disclosure may include: the handle 210 having the inflow path 201 through which the washing water 51 flows and the discharge flow path 207 through which the contaminated water 53 sucked from the oral cavity flows; the mouthpiece 230 connected to the inflow path 201 and configured to spray the washing water 51 into the oral cavity; the core suction part 250 configured to suck the contaminated water 53 that has been discharged from the mouthpiece 230 and washed the teeth; and the suction pipe 270 configured to connect the core suction part 250 and the handle 210. A water diffuser 216 is disposed in the mouthpiece 230. The water diffuser 216 divides the contaminated water 53 discharged from the suction pipe 270 and supplies the contaminated water 53 to the discharge flow path 207.

The contaminated water 53 sucked from the core suction part 250 and the contaminated water 53 sucked from the front suction hole 239 flow in the suction pipe 270. The streams of contaminated water 53 introduced in the different directions collide with each other.

The water diffuser 216 divides the contaminated water 53 discharged from the suction pipe 270. The water diffuser 216 divides the flow direction of the contaminated water 53. The water diffuser 216 mitigates the collision of the streams of contaminated water 53. The water diffuser 216 guides the contaminated water 53 so that the contaminated water 53 has predetermined directionality. The water diffuser 216 increases the flow velocity of the contaminated water 53 flowing along the discharge flow path 207. The water diffuser 216 makes the pressure in the discharge flow path 207 lower than the pressure in the suction pipe 270.

Referring back to FIGS. 28 and 31, the direction of the contaminated water 53 is changed as the contaminated water 53 passes through the bending channel 275. The water diffuser 216 is disposed on the centerline 271C of the front channel.

The bending channel 275 is disposed in a straight line in the direction toward the upstream side 207a of the discharge flow path 207. The bending channel 275 is disposed to be inclined in the direction toward the downstream side 207b of the discharge flow path 207. One side of the water diffuser 216, which is directed toward the front channel 271, is disposed in parallel with the centerline 271C of the front channel, and the other side of the water diffuser 216 is inclined in a direction identical to a direction in which the bending channel 275 is inclined. An angle at which the other side of the water diffuser 216 is inclined may be equal to an angle at which the bending channel 275 is inclined.

A part of the contaminated water 53 having passed through the suction pipe 270 flows along the water diffuser 216. If the angle of the inclined water diffuser 216 is excessively large, the flow separation of the contaminated water 53 may occur. Therefore, it is preferred that the water diffuser 216 is not excessively inclined.

The water diffuser 216 and the water splitters 256a and 256b smoothly merge the streams of contaminated water 53, thereby reducing the occurrence of wake turbulence or turbulent flows with spiral shapes. The water diffuser 216 and the water splitters 256a and 256b smoothly merge the streams of contaminated water 53, thereby reducing vibration and noise.

While the exemplary embodiments of the present disclosure have been illustrated and described above, the present disclosure is not limited to the specific exemplary embodiments, and various modifications can of course be made by those skilled in the art to which the present disclosure pertains without departing from the subject matter of the present disclosure as claimed in the claims. Further, the modifications should not be appreciated individually from the technical spirit or prospect of the present disclosure.

What is claimed is:

1. An oral cavity cleaner comprising:
   a mouthpiece configured to spray washing water;
   a core suction part connected to the mouthpiece and configured to suck contaminated water;
   a handle comprising an inflow path through which the washing water flows, a discharge flow path through which the contaminated water flows, and a diffusion flow path configured to define a space in which the washing water flows in a direction toward at least one of upper and lower sides of the discharge flow path, the diffusion flow path being configured to supply the washing water to the mouthpiece; and
   a suction pipe configured to connect the core suction part and the discharge flow path,
   wherein the handle comprises a diffusion boundary portion disposed at an upstream side of the discharge flow path,
   wherein the diffusion boundary portion has a diffusion boundary groove fastened to one end of the suction pipe and protrudes in the handle to prevent the washing water flowing along the diffusion flow path from being introduced into the discharge flow path, and
   wherein a diffusion restriction portion is formed at the core suction part and configured to block an inflow of the washing water flowing along the diffusion flow path, and a diffusion restriction groove is formed in the diffusion restriction portion and fastened to another end of the suction pipe.

2. The oral cavity cleaner of claim 1, wherein the handle comprises a connection partition wall disposed in an oblique direction so that a cross-sectional area of the discharge flow path decreases from a rear end thereof to a front end thereof.

3. The oral cavity cleaner of claim 1, wherein a flow path guide is disposed in the handle and provided at a point at which the handle and the mouthpiece are connected, and the flow path guide allows the washing water discharged from the inflow path to flow in different directions.

4. The oral cavity cleaner of claim 3, wherein the flow path guide is inclinedly disposed on a centerline of the mouthpiece and the handle.

5. The oral cavity cleaner of claim 1, further comprising:
   the suction pipe configured to connect the core suction part and the discharge flow path and define a concentration flow path through which the contaminated water flows,
   wherein the suction pipe is detachably disposed in the diffusion flow path.

6. The oral cavity cleaner of claim 5, wherein the diffusion flow path and the concentration flow path intersect each other.

7. The oral cavity cleaner of claim 1, wherein the handle comprises a mouth guard formed on an outer peripheral surface of the handle and having transverse ends curved rearward.

8. The oral cavity cleaner of claim 1, wherein the handle comprises an elliptical mouth guard formed in an elliptical shape and having transverse ends curved rearward.

9. An oral cavity cleaner comprising:
   a mouthpiece configured to spray washing water;
   a core suction part connected to the mouthpiece and configured to suck contaminated water;
   a handle comprising an inflow path in which the washing water flows, a diffusion flow path configured to connect the inflow path and the mouthpiece, and a discharge flow path through which the contaminated water discharged from the core suction part flows;
   a suction pipe configured to connect the core suction part and the discharge flow path,
   wherein the handle comprises:
   a diffusion boundary portion disposed at an upstream side of the discharge flow path;
   an inflow partition wall configured to define the inflow path;
   a discharge partition wall spaced apart from the inflow partition wall and configured to define the discharge flow path; and
   a connection partition wall configured to connect the discharge partition wall and the inflow partition wall and disposed to be inclined with respect to a centerline,
   wherein a diffusion restriction portion is formed at the core suction part and configured to block an inflow of the washing water flowing along the diffusion flow path, and a diffusion restriction groove is formed in the diffusion restriction portion and fastened to one end of the suction pipe, and
   wherein the diffusion boundary portion protrudes in the handle to prevent the washing water flowing along the diffusion flow path from being introduced into the discharge flow path and has a diffusion boundary groove fastened to another end of the suction pipe.

10. The oral cavity cleaner of claim 9, wherein the suction pipe comprises:
    a front channel connected to the discharge flow path;
    a rear channel connected to the core suction part; and
    a bending channel configured to connect the rear channel and the front channel and disposed to be inclined with respect to the centerline of the handle.

11. The oral cavity cleaner of claim 9, further comprising:
    a mouth guard formed on an outer peripheral surface of the handle and having transverse ends curved rearward.

12. An oral cavity cleaner comprising:
    a handle comprising an inflow path through which washing water flows and a discharge flow path through which contaminated water flows;
    a mouthpiece connected to the inflow path and configured to spray the washing water;
    a core suction part connected to the mouthpiece and configured to suck the contaminated water;
    a suction pipe configured to connect the core suction part and the handle; and
    a damper formed in the mouthpiece and disposed in a transverse direction of the suction pipe to prevent a collision between the washing water and the suction pipe,
    wherein the mouthpiece comprises a front suction hole formed at an upper side or a lower side of the mouthpiece, and a vertical protrusion formed at an edge of the front suction hole.

13. An oral cavity cleaner comprising:
    a handle comprising an inflow path through which washing water flows and a discharge flow path through which contaminated water flows;
    a mouthpiece connected to the inflow path and configured to spray the washing water;

a core suction part connected to the mouthpiece and configured to suck the contaminated water;

a suction pipe configured to connect the core suction part and the handle; and a water diffuser disposed in the handle, wherein the suction pipe comprises:

a front channel connected to the discharge flow path of the handle;

a rear channel connected to the core suction part; and a bending channel disposed to be inclined with respect to a centerline of the rear channel and a centerline of the front channel and configured to connect the rear channel and the front channel, and wherein one side of the water diffuser, which is directed toward the front channel, is disposed in parallel with the centerline of the front channel, and another side of the water diffuser is inclined in a direction identical to a direction in which the bending channel is inclined.

14. The oral cavity cleaner of claim 13, wherein the water diffuser is disposed on the centerline of the front channel.

15. The oral cavity cleaner of claim 13, wherein an angle at which said another side of the water diffuser is inclined is equal to an angle at which the bending channel is inclined.

16. The oral cavity cleaner of claim 13, wherein the mouthpiece has a front suction hole formed at an upper side or a lower side of the mouthpiece, the suction pipe has a vertical channel disposed at an upper side of the rear channel and configured to communicate with the front suction hole, and the rear channel has a vertical bar formed at a lower side of the rear channel.

* * * * *